United States Patent [19]

Pruznick et al.

[11] 4,158,838

[45] Jun. 19, 1979

[54] IN-RASTER SYMBOL SMOOTHING SYSTEM

[75] Inventors: Michael D. Pruznick, Huntington Beach, Calif.; Bruce W. Keller, Scotland, Ark.; James R. Phelps, Torrance, Calif.; Gerald Wolfson, Los Angeles, Calif.; James L. Heard, Torrance, Calif.

[73] Assignee: Hughes Aircraft Company, Culver City, Calif.

[21] Appl. No.: 869,721

[22] Filed: Jan. 16, 1978

Related U.S. Application Data

[63] Continuation of Ser. No. 674,781, Apr. 8, 1976.

[51] Int. Cl.[2] .................. G06F 3/14

[52] U.S. Cl. .................. 340/750; 178/30; 358/133; 340/799; 340/728; 340/793

[58] Field of Search .................. 340/324 AD; 178/15, 178/30; 358/133-138

[56] References Cited

U.S. PATENT DOCUMENTS

| | | | |
|---|---|---|---|
| 3,573,789 | 4/1971 | Sharp | 340/324 AD |
| 3,786,478 | 1/1974 | King, Jr. | 340/324 AD |
| 3,789,386 | 1/1974 | Itoh | 340/324 AD |
| 3,878,536 | 4/1975 | Gilliam | 340/324 AD |
| 3,893,100 | 7/1975 | Stein | 178/30 |
| 3,921,164 | 11/1975 | Anderson | 340/324 AD |
| 4,063,232 | 12/1977 | Fernald | 178/30 |
| 4,079,367 | 3/1978 | Yonezawa et al. | 340/324 AD |

*Primary Examiner*—Marshall M. Curtis
*Attorney, Agent, or Firm*—Lawrence V. Link, Jr.; W. H. MacAllister; Walter J. Adam

[57] ABSTRACT

A symbol smoothing system for synthetically increasing the effective resolution of an in-raster symbol generator memory by a factor of four. The system stores a special three bit code in selected memory elements representative of the existing and past two memory lines with the code actually being a video brightness distribution and positioning offset code. A code number in a single memory cell defines positional and intensity information for the display elements corresponding to that memory cell and to selected surrounding eight memory cells, all of the memory cells having time or positional correspondence to display element positions. The stored codes in the surrounding memory cells, as well as the instantaneous memory cell being decoded, provide intensity levels which are combined at selected display element positions. The video data input for each memory cell consists of the fractional X and Y position bit and symbol type bit and from each memory element, eight additional display elements are developed having selected brightness levels. By decoding this code bit information, the in-raster symbology provides a smooth transition from one display line to the next so as to eliminate the staircase effect in rotated or non-orthogonal lines. For each memory cell in a first field, such as the odd field, every other display resolution element is generated principally from the code in the memory cell and the alternate resolution element is generated principally from the same code. For the other field, such as the even field, the two elements on the display are generated principally from same information code in the memory cell. Further, each resolution element defined by a memory cell can have its intensity increased by codes stored in surrounding memory cells. The three bit memory codes define the location of the imaginary display elements and the video distribution patterns, which patterns simulate a gaussian brightness distribution to temper the edge sharpness of the digitally derived symbology. Thus by storing a single code for each selected memory cell, the system by proper decoding of the codes stored in that memory cell and the surrounding memory cells, develops both positional and intensity display information for the display elements while increasing the effective resolution of the in-raster symbol generator refresh memory by a factor of four. Another feature in accordance with the invention is the use of a common decoding structure by altering the stored codes with a bit rotator so as to be compatible with the common decoding structure, with the altered code representing the correct condition to be decoded.

10 Claims, 29 Drawing Figures

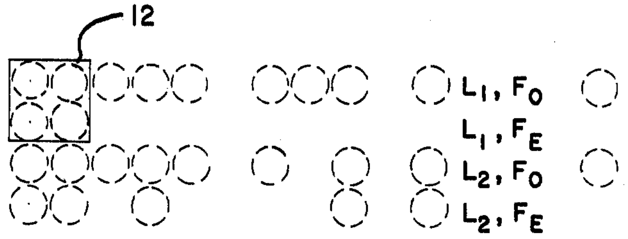
Fig. 1.
Fig. 2.
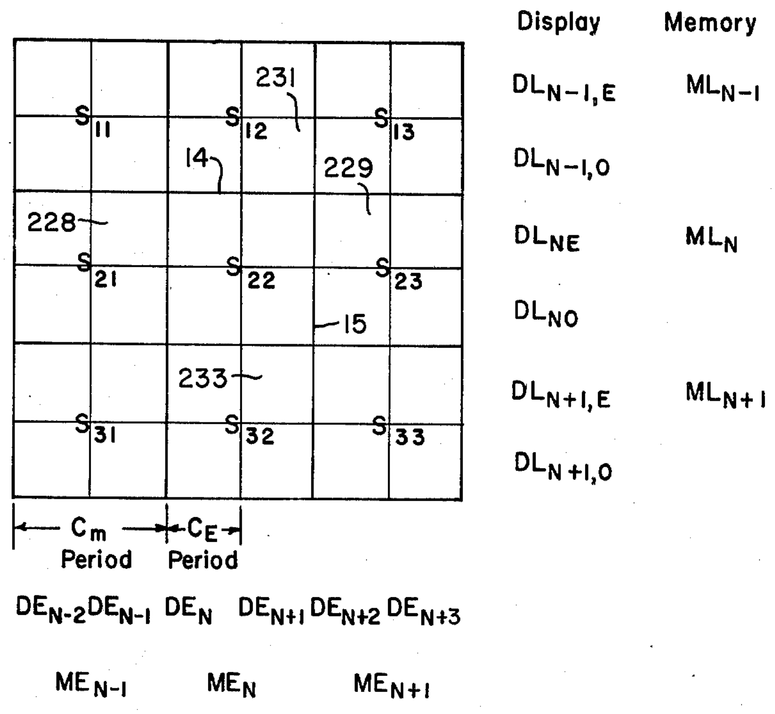
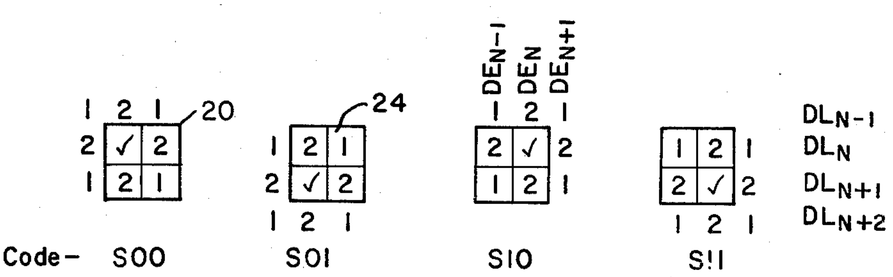
Fig. 3.

Smoothing Program A

Fig. 6.
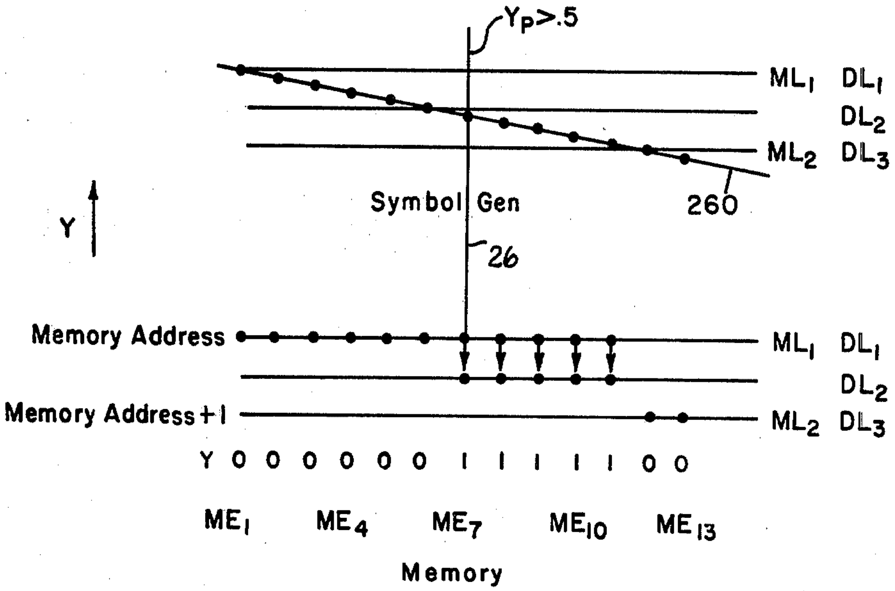
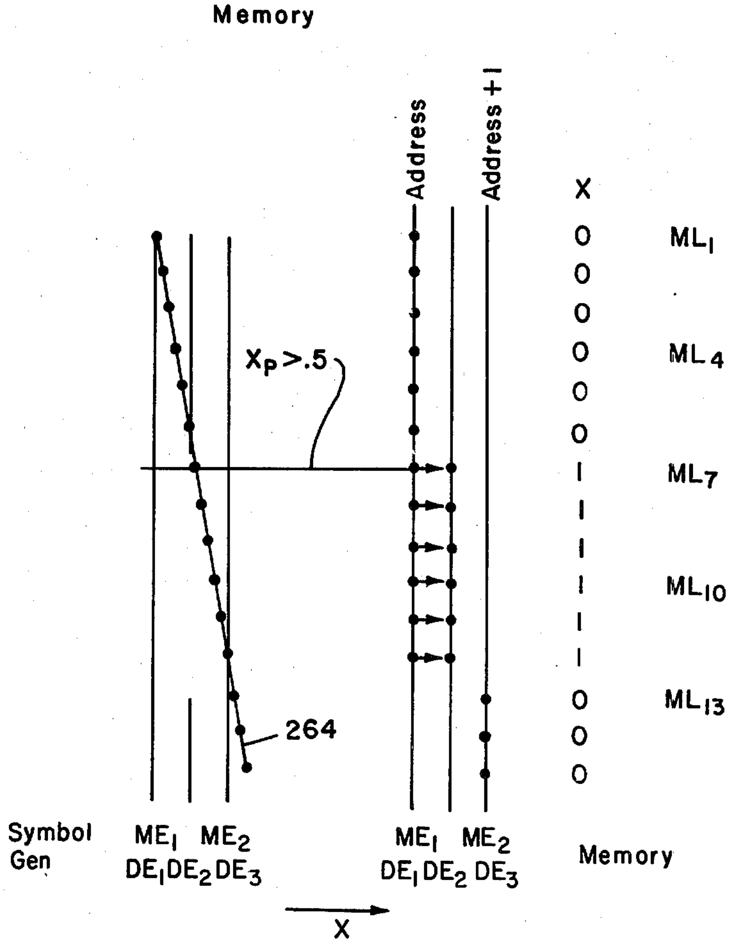
Fig. 7.

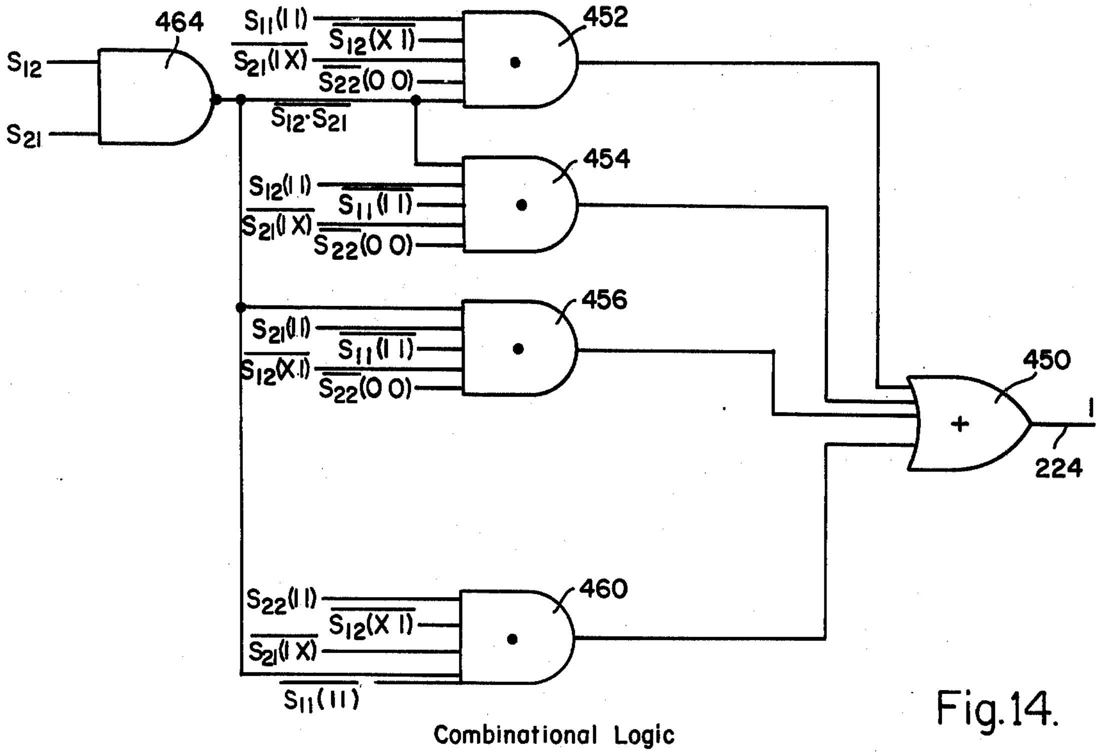
Combinational Logic
Fig.14.
Fig.17
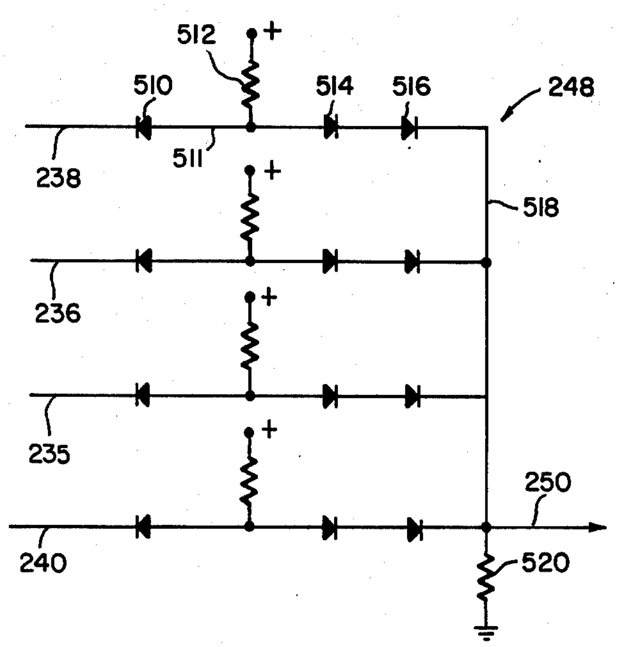

Combinational Logic

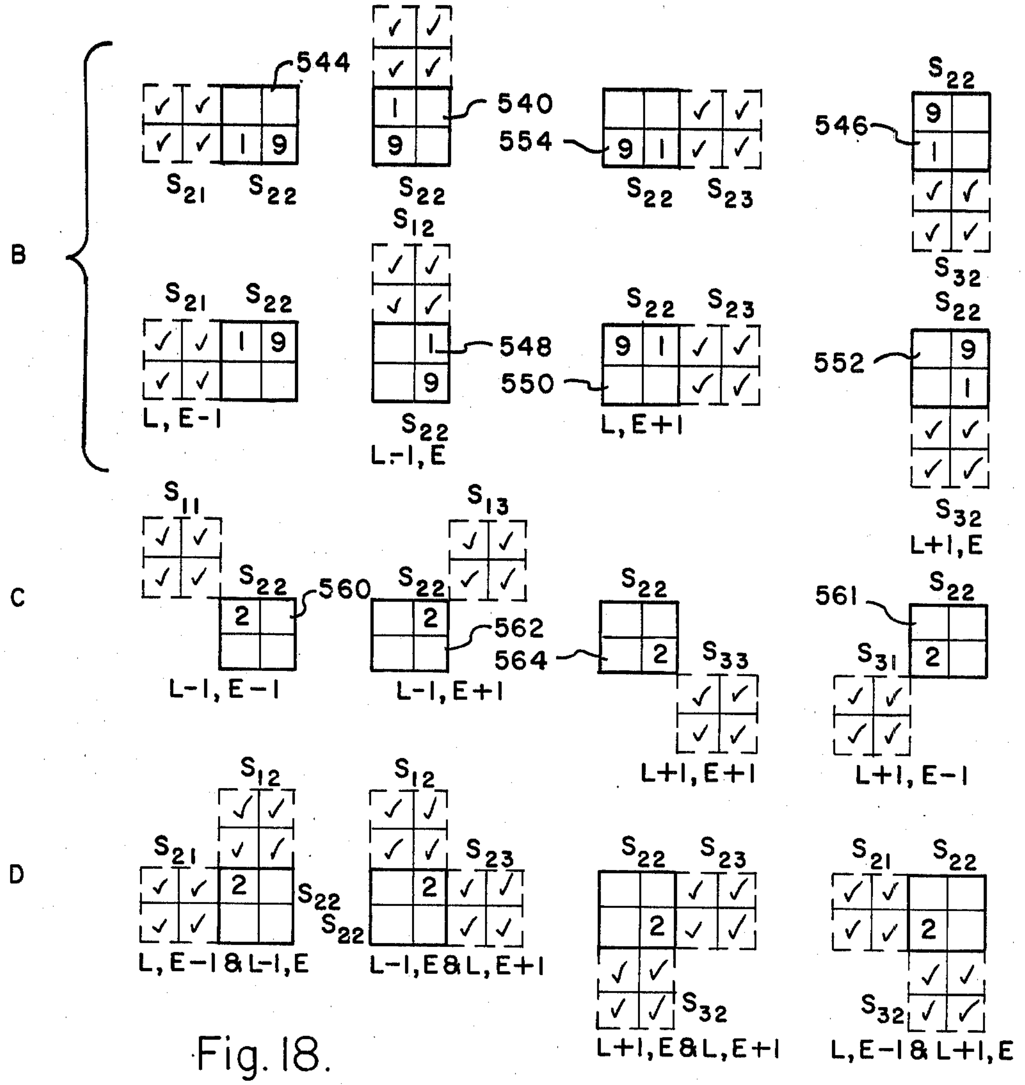
Fig. 18.
Fig. 19.
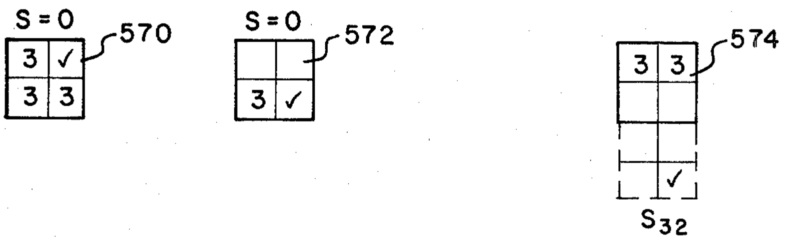

Program B, C and D Improvements

20°

IN-RASTER SYMBOL SMOOTHING SYSTEM

The invention herein described was made in the course of or under a Contract or Subcontract thereunder with the United States Navy.

This is a continuation of application Ser. No. 674,781 filed Apr. 8, 1976.

BACKGROUND OF THE INVENTION

1. Field of the Invention

This invention relates to raster type display systems and more particularly to a TV display system that generates high quality in-raster symbology with a reasonable size refresh memory for providing smooth transitions of symbology across raster lines by artifically generating intensity modulations.

2. Description of the Prior Art

Conventionally, in order to generate high resolution in-raster or television (TV) symbology, the resolution of the symbols is increased to the extent that the raster line transitions are small enough so as to not be noticeable. In order to provide this high quality resolution a very large refresh memory is required and the symbol generator writing efficiency is relatively low. Because the refresh memory is the major component of high resolution symbol generating systems, conventional high resolution in-raster display is relatively expensive and complex. Unless the resolution is substantially high in in-raster symbology, a staircase effect is provided to the viewer in rotated or non-orthogonal lines. It would be a substantial advantage to the art if an in-raster generation system were provided that would provide a symbology equivalent in quality to stroke written symbology.

SUMMARY OF THE INVENTION

The symbol smoothing system in accordance with the principles of the invention utilizes a decoding scheme which stores in each selected memory cell a three bit data code which is actually a video brightness distribution and a positioning off-set code. The code represents the symbol type and the partial X and Y position values which indicates when the symbol being presented is more than half way between defined memory locations or addresses, a code number in a single memory cell defines positional and intensity information for display elements corresponding to that memory cell and the surrounding eight memory cells. Also by utilizing the codes in the surrounding memory cells the intensity values corresponding to a single code is varied to provide a resultant intensity for each display element. Access to symbolic data from the refresh memory for three adjacent display lines is provided by a suitable register arrangement so that nine sets of three bit codes are available at any instant. These nine codes correspond to the code of the memory cells to be displayed and the eight surrounding cells. A combination of logic decode circuits operate on the data from the surrounding memory cells and the display cell, and provide intensity modulation of 0, 1, 2 or 3. The three bit code stored in memory which defines imaginary cell locations, video intensity and the video distribution pattern approximate a gaussian brightness distribution to temper the edge sharpness of the digitally derived symbology. The coding system in accordance with the invention utilizes a main algorithm approximating a gaussian distribution and additional algorithms as desired to improve any deficiencies of the main algorithm. One feature of the invention as provided by the coding arrangement allows use of approximately one quarter of the structure required for decoding all of the code conditions. Regardless of the slope of line or curves being generated on the display, the smoothing system of the invention provides high quality in-raster symbology with a minimum of complexity and refresh memory size.

It is thus an object of this invention to provide a high quality in-raster symbol generating system that operates with a reasonable size refresh memory.

It is a further object of this invention to provide a system that with a minimum of complexity develops in-raster symbology equivalent in quality to stroke written symbology.

It is another object of this invention to provide in-raster symbology having a relatively high resolution with only a relatively small refresh memory.

It is a further object of this invention to provide a symbol generating system having a minimum of complexity and a maximum of equipment efficiency.

It is a still further object of this invention to provide a display system that develops in-raster symbology having a smooth transition from one line to the next to eliminate the staircase effect in rotated or non-orthogonal display lines.

It is a further object of the invention to provide a display system that utilizes a reduced memory size for equivalent display resolution in order to allow more symbology to be written into a memory.

BRIEF DESCRIPTION OF THE DRAWINGS

The novel features of this invention as well as the invention both as to its method of organization and method of operation, will be best understood from the accompanying description, taken in connection with accompanying drawings, in which like reference characters refer to like parts, and in which:

FIG. 1 is a schematic diagram showing the relationship of the memory cell and the display resolution elements as provided by the system of the invention.

FIG. 2 is a schematic diagram of nine of the memory cells utilized for instantaneously developing decoded intensity values at the time position of the central $S_{22}$ memory cell, showing their relationship to the display field and lines and showing the symbolic codes that are stored therein.

FIG. 3 is a schematic diagram of groups of memory and display cells for initially describing the intensity distribution defined by the codes in a single isolated memory call as utilized in the system of the invention.

FIG. 6 is a schematic diagram showing the generation of the Y partial bit of the symbol code by a stroke generator.

FIG. 7 is a schematic diagram for illustrating the generation of the X partial of the symbol code in the stroke generator.

FIGS. 14, 15 and 16 are logical diagrams for explaining the symbol intensity decoding in the combinational logic unit of FIG. 11 in accordance with the invention.

FIG. 17 is a schematic diagram of the digital-to-analog (D/A) converter for responding to the decoded intensity values to control the intensity of the displayed elements.

FIG. 18 is a schematic diagram of the memory cells for explaining the smoothing programs B, C and D that may be utilized to improve the effect of program A.

FIG. 19 is a schematic diagram of the memory cells for explaining the non-smoothed video code that may be utilized in the system of the invention.

DESCRIPTION OF THE PREFERRED EMBODIMENT

Figure 4:
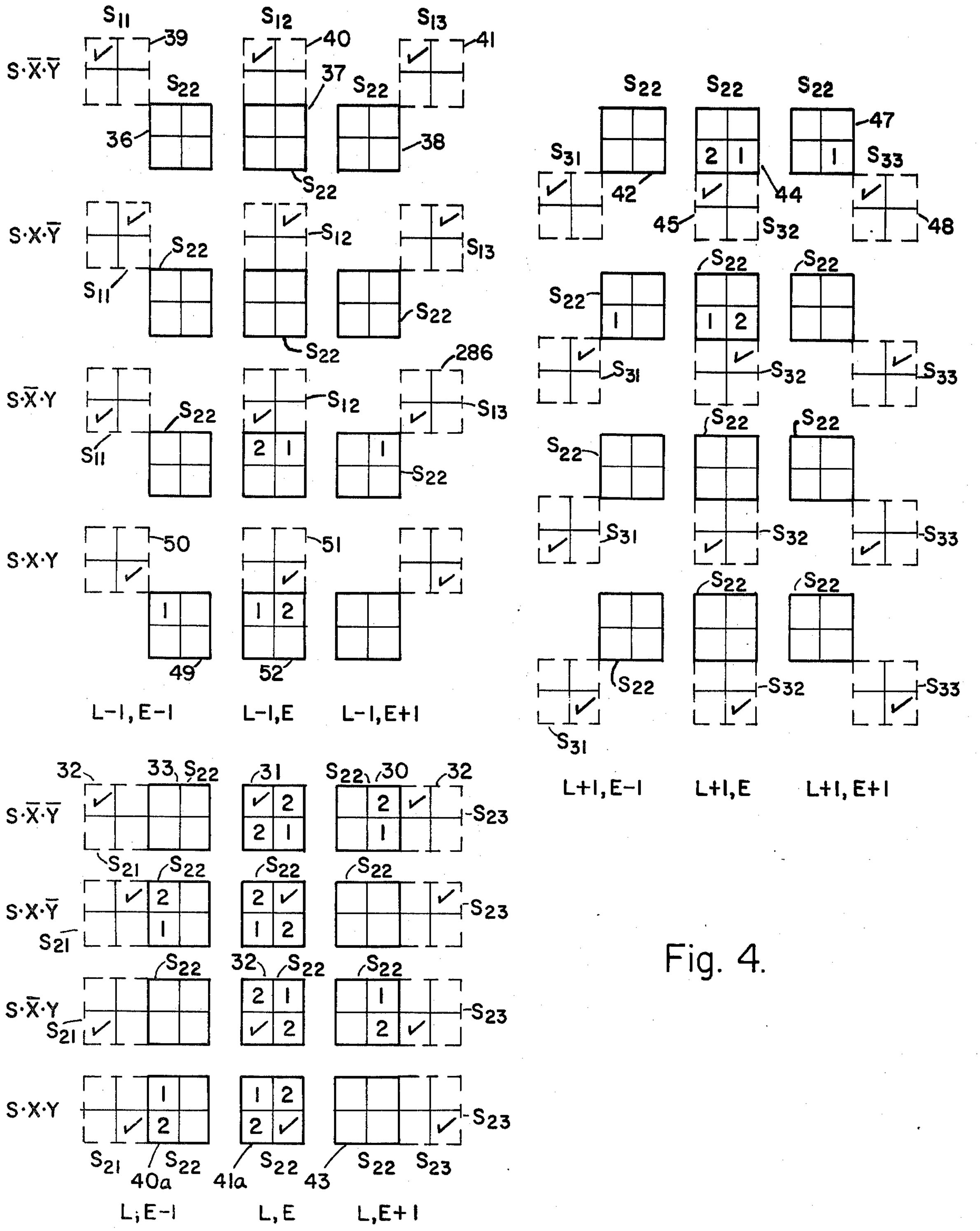
FIG. 4 is a schematic diagram of the symbol code or smoothing program A for further explaining the operation of the smooth code decoding.

Referring first to FIG. 1 for generally explaining the concept of the invention, the dashed circles represent display resolution element locations. There exists one memory cell for each four display resolution elements. The memory cell such as 12 contains the code that in combination with any surrounding memory codes allows writing of the display resolution elements. The box 12 (which includes lines $L_1$, $F_O$ and $L_1$, $F_E$) represents four display elements whose position and intensity is derived from the code stored in the memory cell which code is read out from the memory both for generating the odd ($F_O$) and for generating the even ($F_E$) field. Also from the code stored in box 12, intensity and position are derived for five surrounding display elements in addition to the four display elements in the box. It is to be noted that codes in surrounding memory cells may contribute to the intensity in the nine display elements defined by a single code. The stored code which is a three bit code is actually a video brightness distribution and positioning off-set code and it defines the imaginary cell locations indicated by the dashed circles, video off or the absence of video and a video intensity distribution pattern. In the processing of the three bit code, serial digital symbol video is outputted that contains both real cell and derived imaginary cell video to provide an edge smooth brightness distribution when forming lines or symbols.

Referring now to FIG. 2 the three bit code utilized in the system of the invention will be further explained relative to the display resolution element locations. The code utilizes three bits SXY where S is smoothing or non-smoothing, and X and Y are the partials or fractional address bits in the respective X and Y directions as generated by the symbol generator representing when the line to drawn changes to a corresponding different element location on the display where:

100 is a smooth symbol where X equals 0, Y equals 0
101 is a smooth symbol where X equals 0, Y equals 1
110 is a smooth symbol where X equals 1, Y equals 0
111 is a smooth symbol where X equals 1, Y equals 1.

The operation of the system of the invention involves storing a special three bit code for three memory elements of the existing line and past two lines which is an interlaced display in the illustrated arrangement with the same code utilized for both deriving symbol elements in the odd and even fields. The symbology shown represents the nine memory cells for writing display resolution elements and defined as $S_{11}$, $S_{12}$, $S_{13}$, $S_{21}$, $S_{22}$, $S_{23}$, $S_{31}$, $S_{32}$ and $S_{33}$ with the contents of the nine memory cells being available for writing a display element in the time positions of memory cell $S_{22}$ and for a single display element at the time position such as a square 14. In each memory cell such as $S_{22}$, shown as a four square box 15, the four element positions found on the display are given the element XY codes 00, 10, 01 and 11 which effectively defines the coding system in accordance with the invention. In operation the central memory cell $S_{22}$ is given the designation $ME_N$ and $ML_N$ and the display elements contained within that memory cell are designated $DE_N$ and $DE_{N+1}$ in the element dimension $DL_{NO}$ and $DL_{NE}$ (odd, even) in the line dimension. By storing a code in memory cell $S_{22}$ and in selected memory cells surrounding memory cell $S_{22}$, reading the code from memory for display elements $DE_N$ and $DE_{N+1}$ for line $D_{LNE}$ and during the next field reading the code from memory for line $DL_{NO}$, all four display elements (as well as selected display elements and surrounding boxes) are written from a single code, and each memory element that is written has a predetermined intensity. For each display line, two display elements in the box 15 (as well as 5 display elements outside box 15) are derived from the code in box 15 and the surrounding memory cells. It is to be noted that although the instantaneous output video into the display occurs at the time position of the block 14 that this time position moves relative to the stored memory codes along each line of the first field then along each line of the second field.

For an understanding of the codes that may be stored in any single memory cell, reference is now made to FIG. 3 which shows the intensity distribution from each of the codes S00, S01, S10 and S11 with the check indicating the symbolic position of the actual data stored in memory as shown by the four XY code value of the cell $S_{22}$ of FIG. 2. As shown at a cell 20 representing the code S00, and X dimension and the Y dimension have 0 and 0 values so that the check is in the 00 display position. Similarly for the codes S01, S10 and S11 the check is in the corresponding cell position of the four element cell. The pattern provided by each code such as the code S01 has an intensity value of 1, 2 or 3 (with the check representing an intensity value of 3) not only in the four display elements formed from the cell, but also in surrounding display elements such as for code S01, display element $DE_{N-1}$ of lines $DL_N$, $DL_{N+1}$ and $DL_{N+2}$ and display elements $DE_{N-1}$, $DE_N$ and $DE_{N+1}$ for line $DL_{N+2}$. It is to be noted that the video output is applied to the display during the time periods of the memory element 24 and the surrounding intensity values as well as the intensity values corresponding to the memory cell position are developed when writing into that display element position by looking at the code in the memory cell 24 (as well as looking at surrounding memory cells for combining intensity values). Because of the symmetry of the roational algorithm, substantially any shape or slope line or curve may be formed with the improved intensity distribution in accordance with the invention. As will be explained subsequently the code in each cell also has a characteristic that intensity values are combined with designated intensity values of adjacent cells as shown in FIG. 2 so that a line being formed has a maximum intensity of 3 in the region around the maximum intensity line and in adjacent positions has an intensity distribution of 1 or 2.

Referring now also to FIG. 4 the main smoothing program which is called smoothing program A is shown to illustrate the intensity values and the distribution provided by a single code in an isolated memory cell, that is, without any combinational effect of codes in surrounding memory cells. The solid boxes represent the instantaneous video outputs that are derived from codes in the solid box or from the code being in memory address positions in surrounding dotted boxes and is always defined as $S_{22}$. Each of the column of solid boxes or solid and dotted boxes is labeled as to the memory line and memory element of the stored code relative to the instantaneous position of $S_{22}$. The four positions within each box represent display element positions. The memory address may be considered moving from left to right between memory elements E−1, E and E+1 for each memory line L−1, L and L+1. The check in each box represents the symbolic position of the single stored code and only one memory code is stored in each memory cell or box. The dashed boxes represent the eight surrounding memory cells at different memory line and element addressing times.

For example when writing a code 00 when the code is in line L−1 and elements E−1, E and E+1, 0 intensity values are developed as shown by boxes 36, 37 and 38 with the code stored in boxes 39, 40 and 41. When the code is stored in memory line L and memory element E−1, a 0 intensity is also developed in box 33 because the code is stored in box 32.

When addressing memory cell 31 at memory line L and memory element E, which is the memory cell containing the code, the values of box 31 are developed, that is during the period of two display lines or fields and two display element periods. When addressing box 30 and the code is stored in memory element E+1 of memory line L, and 2 and 1 intensity values are developed as shown in box 30 responding to the code stored in memory box 32. When addressing box 42 and the code is stored in the next memory line L+1 and the memory element E−1 a 0 intensity is written into all display element positions as shown by the box 42. When the code is stored in memory element E of that memory line a 2 and a 1 intensity are developed as shown by box 44 in response to the code stored in memory box 45. At the time of the code being stored in the next memory element which is E+1, a 1 is derived as shown by box 47 in response to the code stored in box 48.

Also relative to FIG. 4 with a code 11 stored in the isolated memory cell, when the code is stored in memory line L−1 and memory element E−1 a 1 is developed in the display element portion of a box 49 in response to that code stored in a memory box 50. When the code is stored in memory element E, 1 and 2 intensity levels are developing the display element positions of box 52 in response to the code in memory box 51, and when the code is stored in memory element E+1 and line L−1 no intensity levels are written in $S_{22}$. When the 11 code is stored in memory line L and sequentially memory element E−1, E and E+1, the intensity values of memory boxes 40a, 41a and 43 are developed at the corresponding display element positions because of the code being respectively in positions $S_{21}$, $S_{22}$ and $S_{23}$.

When the code is stored in memory line L+1 and memory elements E−1, E and E+1, 0 intensity values are derived for the display elements in the $S_{22}$ memory cell. In a similar manner for each of the other two codes, the combination of the positional intensity values as shown in FIG. 4 provides the distribution as shown on FIG. 3 as the display elements are derived for three display lines and three display elements from the code stored in a single memory cell. The symoblic representation of FIG. 4 is for a single stored code in one memory cell but by combining the effect of codes in selected adjacent nine memory cells, or summing the intensity values, a highly desirable gaussian type distribution may be provided for the displayed lines.

Figure 5A:
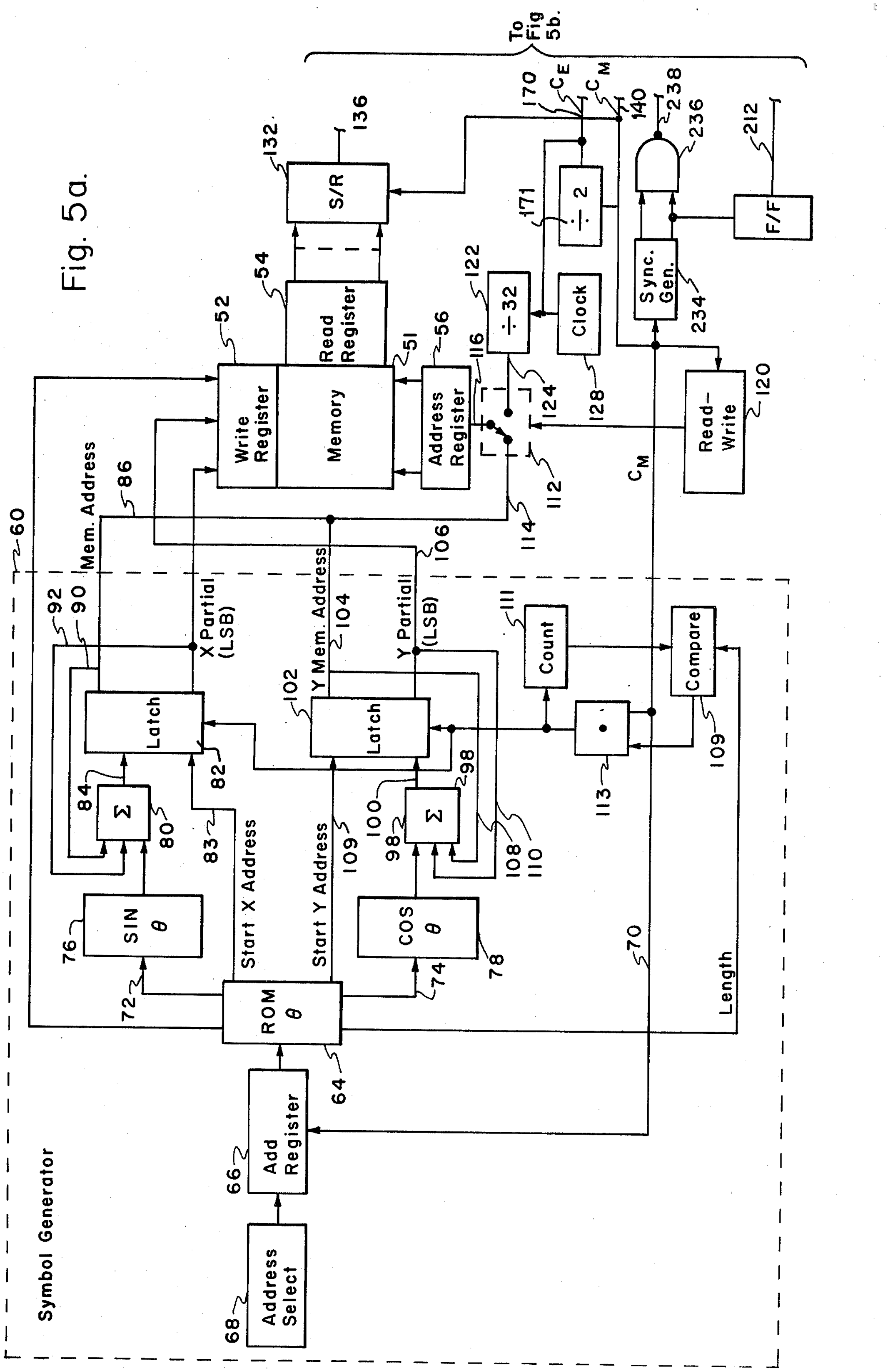
FIGS. 5*a* and 5*b* are schematic block diagrams showing the overall system in accordance with the principles of the invention.

Before further explaining the operation of the coding and decoding in accordance with the invention an illustrative arrangement of the system of the invention will be explained to FIGS. 5*a* and 5*b*. A refresh memory 51 which may be of any conventional type such as a Random access memory is provided and includes a write register 52 and a read register 54 and an address register 56. For generating the symbols such as lines or curves a symbol generator 60 is provided responsive to data stored in a Read Only Memory (ROM) 64 which for any line for example includes an angle $\theta$ representative of the slope of the line relative to the horizontal on the display system. An address register 66 responsive to an address select circuit 68 controls the memory 64 so that for any selected address, register 64 responds to the memory clock $C_m$ on a lead 70 to apply the digital value of $\theta$ through leads 72 and 74 to respective sin $\theta$ and cos $\theta$ generators 76 and 78. The sin $\theta$ generator circuit 76 supplies the sine of $\theta$ to a summer 80 which is coupled through a lead 84 to a latch circuit 82 which has an output on leads 86 and 88, the lead 86 receiving the most significant bits of the X memory address which may be 7 bits and the lead 88 receiving the least significant bit or the X partial. The X memory address from the composite lead 86 and the partial from the lead 88 are coupled through a composite lead 90 and a lead 92 as inputs to the summer 80 so that the signal applied to the composite lead 84 is $\Sigma \sin \theta$ which is the total X address and accumulation of the X increments or partials derived from the register 64. A start X address is applied to the latch 82 on a composite lead 83 from the memory 64 as the starting X address for any line.

The cosine θ generator 78 applies the cos θ signal to a summer 98 which is coupled through a composite lead 100 to a latch 102 which generates the Y memory address of, for example, 7 bits on a composite lead 104 and the Y partial or the least significant bit of the address on a lead 106. The Y memory address is applied on composite lead 108 and a lead 110 to the summer 98 to provide the Y address on the opposite lead 100 equal to Σ cos θ which is summation of the vertical increments derived from the θ stored in the memory 64. A start Y address is also applied on a lead 109 from the memory box to the latch 102 as the starting Y address value for any line.

The length of the line to be drawn is applied from memory 64 and a lead 107 to a compare circuit 109 also receiving the memory clock count from a counter 111 which in turn responds to the clock signal $C_M$ from an AND gate 113. The output of the compare circuit controls the AND gate 113. The memory clock signals passed through the AND gate 113 is also applied to the latch circuits 82 and 102.

The X partial and the Y partial are applied on respective leads 88 and 106 to the write register 52 in combination with the smoothing symbol S which is also stored in the memory 64 so that the code SXY is generated and stored in correct addresses in the refresh memory 51. The X memory address and the Y memory address on the leads 86 and 104 are applied to a switch 112 through a composite lead 114 with the address passing through a lead 116 to the address register 56 in the position shown and reading data from the memory 64 for entry into the refresh memory 51. When the refresh memory 51 includes the stored line data code SXY at the proper address a read write control unit 120 changes the position of the switch 112 so that a clock address is applied from a divide by 32 circuit 122 on a composite lead 124. An element clock 128 applies the clock pulses $C_E$ to the divide by 32 circuit 122 for reading out the codes from 32 element addresses on lines which are applied to the read register 54 and in turn to a shift register 132. In the illustrated arrangement the ratio of reading the memory 64 or writing into memory 51 to the reading of the code from the memory 51 may for example be 1 to 7 as controlled by the read-write control unit 120. The codes during each memory clock period $C_M$ are applied from the shift register 132 in the same sequence corresponding to the display elements on a composite lead 136 to a shift register 138 controlled by the memory clock $C_M$ from a lead 140. The real time data on the composite lead 136 is then applied to a shift register unit 144. The shift register 138 provides a 1 line delay and applies the data from the previous display line through a composite lead 150 to the shift register 144. The composite lead 150 is also applied to a 1 line delay shift register 156 which in turn applied the data from the third memory line or a line delayed two lines from the real time data through a composite lead 160 to the shift register 144. Thus, the shift register 144 contains three memory lines of data with the codes from three memory cells. The shift register unit 144 responds to the element clock signal $C_E$ on a lead 170 as provided by a divide by two circuit 171 receiving the memory clock signal $C_M$. On composite leads 174, 176 and 178 the signals $S_{xy}$, $X_{xy}$ and $Y_{xy}$ are applied to a coordinate transform unit 172.

Any conventional symbol generator may be utilized for providing the codes by utilizing the X and Y least significant bits (LSB) as the output values.

The coordinate transform unit 172 because of the symmetry of the smoothing code which can be varied to use common decoding structure, generates SXY 11*, SXY 12*, SXY 21* and SXY 22* values on respective composite leads 202, 204, 206 and 208 representing four memory cells which are applied to a decode and latch unit 200. The output values from the decode and latch unit 200 are stored in a latch or shift register in that unit and applied to the combinational logic unit 220. It is to be noted that the symbol SXY 11* for example indicates the values S, X and Y derived from cell $S_{11}$ (FIG. 2). The coordinate transform unit 172 responds to both the memory clock $C_M$ on the lead 140 and an even odd (F/O) field signal on a lead 212. The combinational logic unit 220 receives the decoded signals representing the required codes through a composite lead 222 and applies intensity signals on composite leads 224, 226 and 228 respectively representing intensity levels of 1, 2 and 3, to a latch 230 providing a one clock element delay.

A sync generator 234 responds to the memory clock $C_M$ to apply a Horizontal Blank SYNC signal and a Vertical Blank SYNC signal to an OR-gate 236 and in turn through a lead 238 to the latch circuit 230 to provide the horizontal and vertical blanking and the synchronizing signals for the display. The latch circuit 230 applies the intensity pulses on leads 235, 237 and 240 to a digital-to-analog (D/A) converter 248 which generates a common analog intensity signal which is then applied through a lead 250 to a display unit 252 for controlling the intensity grid of a cathode ray tube for example. The horizontal and vertical blank signals and the synchronizing signals also are contained on the lead 250 and are separated out in the unit 252 as is well known in the art. The display unit 252 may be any suitable type such as a standard TV monitor to handle EIA synchronizing signals known as on EIA type RS170.

Referring now to FIGS. 6 and 7 as well as to FIGS. 5*a* and 5*b* the operation of the symbol generator will be explained for developing the partial Y which is the least significant bit of the Y memory address and the Y of the code SXY in response to a line 260 provided by the cosine of θ value from memory 64. For memory elements $ME_1$ to $ME_6$ the cos θ summation provides a Y memory address on line $ME_1$ during which time the least significant bit or $Y_P$ is less than $\frac{1}{2}$. At the address of memory element $ME_7$, $Y_P$ becomes greater than $\frac{1}{2}$ as seen by the line 26 and the partial code Y becomes 1 with the memory address remaining on line $ME_1$. Because of the Y code becoming 1 the display position will move to display line $DL_2$. This condition continues in response to the accumulation of cos θ until the address of memory element $ME_{12}$ at which time $Y_P$ is again greater than 0.5 and the memory address increases by 1 line to line $ML_2$, the resultant display address also increases by 1 to display line $DL_3$. Thus the value of Y which is the least significant bit of the Y address is continually developed by the symbol generator.

For purposes of illustrating the generation of the value X, a substantially vertical line 264 is provided by the Σ sin θ of the sin θ generator 76 and between memory lines $ME_1$ and $ML_6$ X and the address is on memory elements $ME_1$. At line $ML_7$ the partial $X_P$ becomes greater than 0.5 and the memory address continues along the position of elements $DE_1$ but the display address because of the code is along the position of element $ME_2$, the arrows indicating the decoding operation. At the corresponding time of memory line $ML_{13}$, $X_P$ is again greater than 0.5 and the memory address changes to the position of memory element $ME_3$ and the partial (LSB of memory address) X again becomes 0. Thus it can be seen that the symbol generator as illustrated continually generates or develops the code values X and Y along with the change of the memory address applied to the refresh memory 51 for storing that code.

Figure 8B:
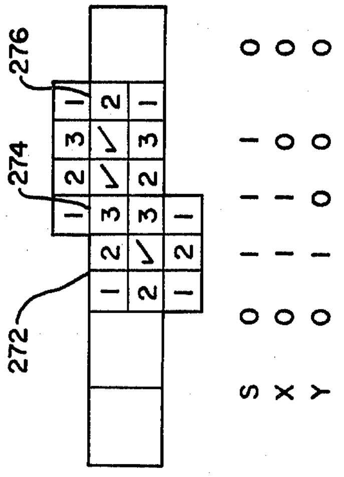
FIGS. 8*a* and 8*b* are schematic diagrams of a line provided by the stroke generator in the X and Y dimensions for further explaining the generation of the X and Y partials of the symbol codes.
Figure 8A:
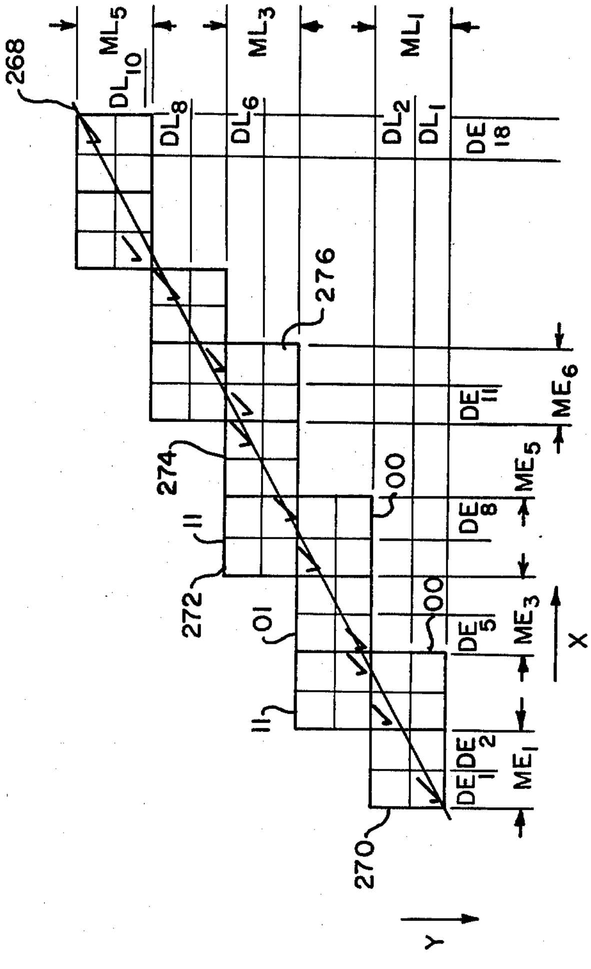

Referring now to FIGS. 8*a* and 8*b* the operation of the symbol generator will be further explained relative to a line 268 formed from the readout values from the memory 64 and the sin $\theta$ and cos $\theta$ summing circuits. The X and Y axis are not time dimensions as the code generation time sequence follows the pattern of sequentially generated codes as the address is generated from random memory cells. The display line positions $DL_1$ to $DL_{10}$ for the vertical dimension and the display element positions $DE_1$ to $DE_{18}$ for the horizontal dimension are shown. It is to be noted that the memory line position and the memory element position occur for each two respective display lines and element positions such as indicated by the memory box 270. As the line 268 is generated for memory element $ME_1$ and memory line $ML_1$ by the symbol generator, the code is 01. At memory element $ML_2$, X and Y both change to 11 as the address increases in the X and Y dimension. It is to be noted that a digital address is provided for each memory clock and this defines the code in the addressed memory cell. At the position of memory element $ME_2$, and $ML_2$ X changes so that X and Y are 11, and at memory element $ME_4$, X and Y change from 00 in cell $ML_2$ to 11 in cell $ML_3$, at $ME_5$, X and Y are 10 and at $ME_6$, X and Y change from 00 in cell $ML_3$ to 10 in cell $ML_4$. Thus it can be seen that the check in each memory cell box represents the code of the stored video coordinate relative to the four elements that will be written from the contents of that memory cell. For illustrative purposes memory cell boxes 272, 274 and 276 are shown with the intensity values provided by the codes therein and with the SXY code stored in the memory cell shown below corresponding to the code generated by the symbol generator in response to the partial values provided representative of the line 268. It can be seen that for each memory cell value the X and Y values representative of the line 268 provide a code and define the values that will be written in the other three display elements as well as five surrounding display elements.

Figure 9:
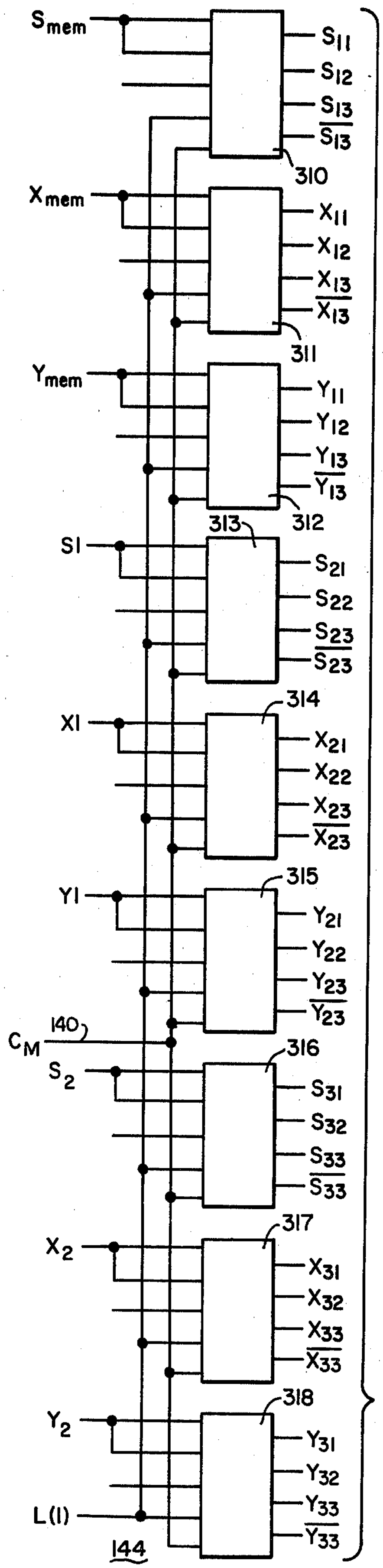
FIG. 9 is a schematic block diagram for explaining the delay shift registers that operate to provide the symbol code availability in the system in accordance with the invention.

Referring now to FIG. 9 the shift register unit 144 of FIGS. 5*a* and 5*b* will be explained in further detail. Shift registers 310 to 318 are provided and may be any suitable shift register for developing a 1 element delay such as 54LS195 units and are arranged to provide all the S, X and Y terms of the total 9 memory cells (3 memory boxes by 3 memory elements) as shown in FIG. 2. Each shift register 310 to 318 responds to the memory clock signal $C_E$ on a lead 170 which element clock is also utilized to read out of the memory 51. At each memory clock shift register 310 responds to the instantaneous value $S_{MEM}$ from lead 136 (FIGS. 5*a* and 5*b*), shift register 311 responds to $X_{MEM}$ from lead 136 and shift register 312 responds to $Y_{MEM}$ from lead 136. The shift registers 313 to 318 respectively receive the values S1, X1, Y1, S2, X2, and Y2 representing the codes from the two previous lines. The outputs of shift register 310 are code values $S_{11}$, $S_{12}$, $S_{13}$, and $\overline{S_{13}}$, of shift register 311 are the values $X_{11}$, $X_{12}$, $X_{13}$, $\overline{X_{13}}$, of shift register 312 are the values $Y_{11}$, $Y_{12}$, $Y_{13}$ and $\overline{Y_{13}}$, of shift register 313 are the values $S_{21}$, $S_{22}$, $S_{23}$ and $\overline{S_{23}}$, of shift register 314 are values $X_{21}$, $X_{22}$, $X_{23}$ and $\overline{X_{23}}$, of shift register 315 are values $Y_{21}$, $Y_{22}$, $Y_{23}$ and $\overline{Y_{23}}$ of shift register 316 are the smoothing values $S_{31}$, $S_{32}$, $S_{33}$ and $\overline{S_{33}}$, of shift register 317 are the values $X_{31}$, $X_{32}$, $X_{33}$ and $\overline{X_{33}}$ and of shift register 318 are the values $Y_{31}$, $Y_{32}$, $Y_{33}$ and $\overline{Y_{33}}$. Thus, shift registers 310, 311 and 312 provide a 1 element delay for the first memory line codes, shift register 313, 314 and 315 provide one element delay for the second memory line codes and shift registers 316, 317 and 318 provide a 1 element delay for the third memory line codes, all of which are simultaneously provided at the outputs of the shift registers for 3 memory lines and 3 memory cells.

Figure 10:
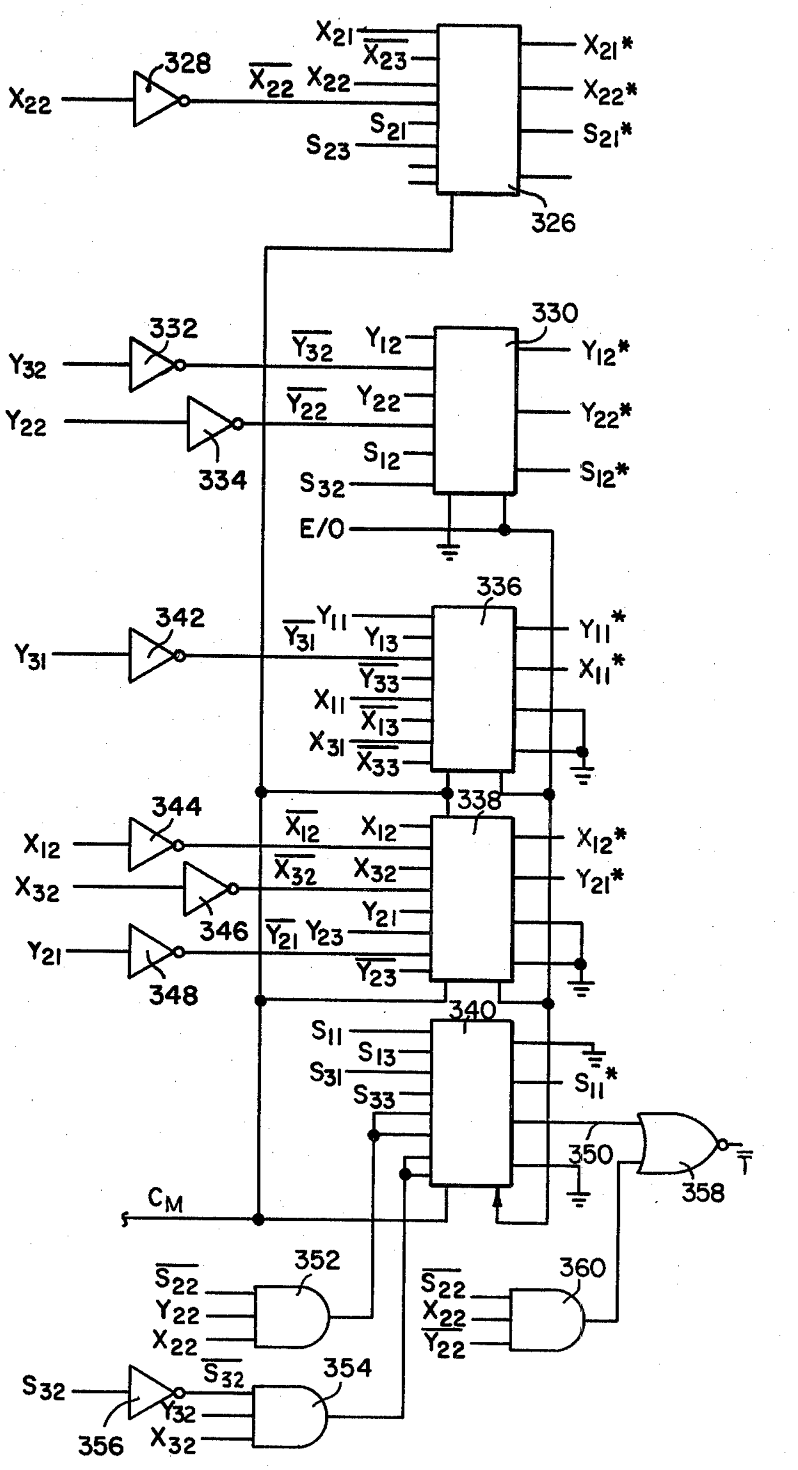
FIG. 10 is a schematic block diagram of the rotator that presents the proper surrounding data for decoding in the illustrated arrangement of the invention.

Referring now to FIG. 10 the rotator structure in accordance with the invention will be explained which allows use of common decoding equations to reduce the decoder 200 mechanization. A logic unit 326 responds to the memory clock $C_M$ on the lead 140 defining elements $E_1$ and $E_2$ derived from each memory cell code. Referring back to FIG. 2, for developing the display element $DE_N$ and line $DL_{NE}$ only the memory cells $S_{11}$, $S_{12}$, $S_{21}$ and $S_{22}$ are utilized by the rotator, for developing the display element $DE_{N+1}$, line $DL_{NE}$ only the memory cells $S_{12}$, $S_{13}$, $S_{22}$ and $S_{23}$ are utilized, for developing the display element $DE_N$, line $DL_{NO}$ only the memory cells $S_{21}$, $S_{22}$, $S_{31}$ and $S_{32}$ are utilized and for developing the display element $DE_{N+1}$, line $DL_{NO}$, only the memory cells $S_{22}$, $S_{23}$, $S_{32}$ and $S_{33}$ are utilized. When decoding the display element in box 14 of cell $S_{22}$ a code such as 10 in cell $S_{21}$ is utilized but in order to utilize a code in cell 229 the 10 must be changed to 00 (invert X) or the common decoding structure would not respond correctly. Similarly when decoding display cell 14 with the code 10 in display cell 231 the decoding structure responds correctly but when decoding display cell 233, in order for the common decoding structure to respond the 11 in cell 233 must be changed to 10 or the Y value inverted. Thus in order to utilize the common decoding structure in accordance with the invention, the code in opposite horizontal or vertical memory cells is adapted to the common decoding as a function of element or line defining the display cell being decoded. The logic unit 326 generates $X_{21}^*$ from $X_{21}$ and $\overline{X_{23}}$, generates $X_{22}^*$ from $X_{22}$ and $\overline{X_{22}}$ and generates $S_{21}^*$ from $S_{21}$ and $S_{23}$. An inverter 328 generates the signal $\overline{X_{22}}$ from $X_{22}$. In the logic unit 326 the expressions $X_{21}^*$, $X_{22}^*$ and $S_{21}^*$ are each generated from AND gates and an OR gate in accordance with the following expressions where $E_1$ and $E_2$ are respectively element 1 or element 2 of any line.

$$X_{21}^* = X_{21}E_1 + \overline{X_{23}}E_2$$

$$X_{22}^* = X_{22}E_1 + \overline{X_{22}}E_2$$

$$S_{21}^* = S_{21}E_1 + S_{23}F_2$$

A logic unit 330 responds to the E/O or even-odd signal ($L_1$ and $L_2$) on the lead 212 representative of line 1 or line 2 of the two lines written from the data in the memory cell and generates the terms $Y_{12}^*$, $Y_{22}^*$ and $S_{12}^*$ in accordance with the following expressions:

$$Y_{12}^* = Y_{12}L_1 + \overline{Y_{32}}L_2$$

$$Y_{22}^* = Y_{22}L_1 + \overline{Y_{22}}L_2$$

$S_{12}^{*}=S_{12}\,L_1+S_{32}\,L_2.$

The input terms $\overline{Y_{32}}$ and $\overline{Y_{22}}$ are generated by respective inverters 332 and 334.

Three additional logic units in the rotator arc logic units 336, 338 and 340 each responsive to the element clock $C_E$ on the lead 170 and to the E/O or line signal on the lead 212. The logic unit 336 generates the signals $Y_{11}^{*}$ and $X_{11}^{*}$, the logic unit 338 generates the signals $X_{12}^{*}$ and $Y_{21}^{*}$ and the logic unit 340 generates the signal $S_{11}^{*}$ in response to the following unit expressions:

$$X_{11}^{*}=X_{11}E_1L_1+\overline{X_{13}}E_2L_2$$

$$Y_{11}^{*}=Y_{11}\,E_1L_1+Y_{13}E_2L_2$$

$$X_{12}^{*}=X_{12}\,E_1L_1+\overline{X_{12}}\,E_2L_2$$

$$Y_{21}^{*}=Y_{21}\,E_1L_1+Y_{23}\,E_2L_2$$

$$S_{11}^{*}=S_{11}\,L_1E_1+S_{13}L_1E_2+S_{31}\,L_2\,E_1+S_{33}\,L_2\,E_2$$

Each of the above expressions is formed by a combination of an AND gate followed by an NOR gate as is well known in the art and need not be explained further. The input to the logic unit 336, $\overline{Y_{31}}$ is formed by an inverter 342 and the inputs to the logic unit 338, $\overline{X_{12}}$, $\overline{X_{22}}$ and $\overline{X_{21}}$ are formed by respective inverters 344, 346 and 348. The logic unit 340 also generates a non-smoothed term on a lead 350 from the output of an AND gate 352 responding to the terms $\overline{S_{22}}$, $Y_{22}$ and $X_{22}$ and an AND gate 354 responding to the terms $\overline{S_{32}}$ from an inverter 356 and the terms $Y_{32}$ and $X_{32}$. A term such as $Y_{32}$ indicates that in that instantaneous memory cell being decoded any code is stored therein. An NOR gate 358 responds to the term on the lead 350 and a non-smooth term from an AND gate 360 in turn responding to the terms $\overline{S_{22}}$, $X_{22}$ and $\overline{Y_{22}}$. The NOR gate 358 generates the term $T=\overline{S_{22}}(01)+\overline{S_{22}}\,(10)\,E+\overline{S_{12}}(10)\,0$ which as will be explained subsequently always indicates an intensity of 3.

Figure 11:
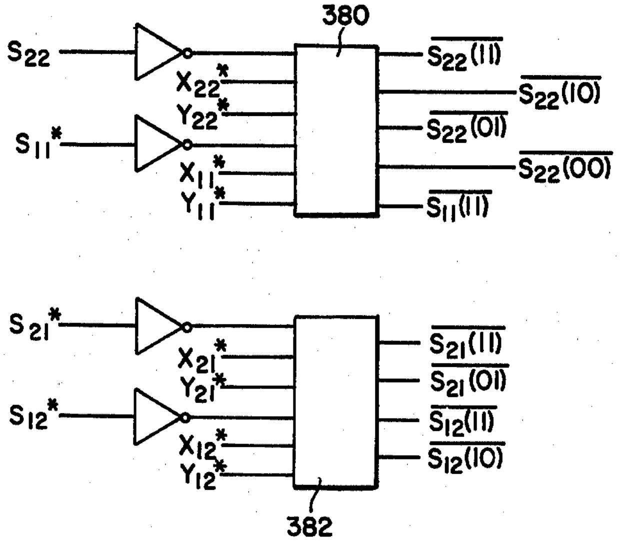
FIG. 11 is a schematic diagram of the logic decoding system for providing a decoded intensity code.
Figure 12:
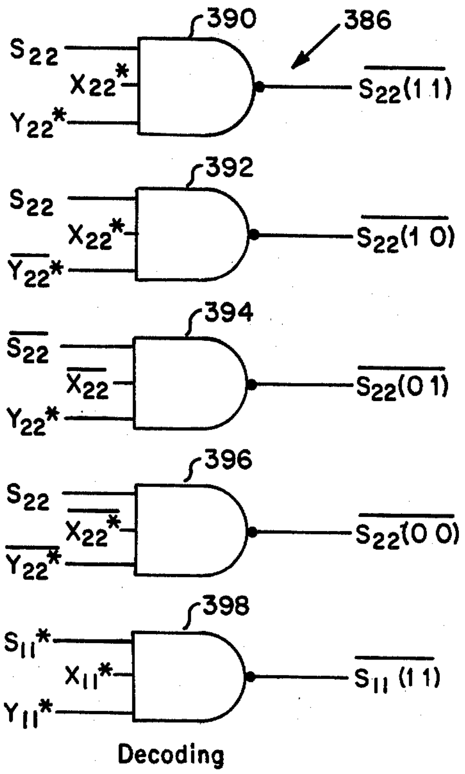
FIGS. 12 and 13 are logical diagrams for explaining the operation of the symbol decoding in accordance with the invention.
Figure 13:
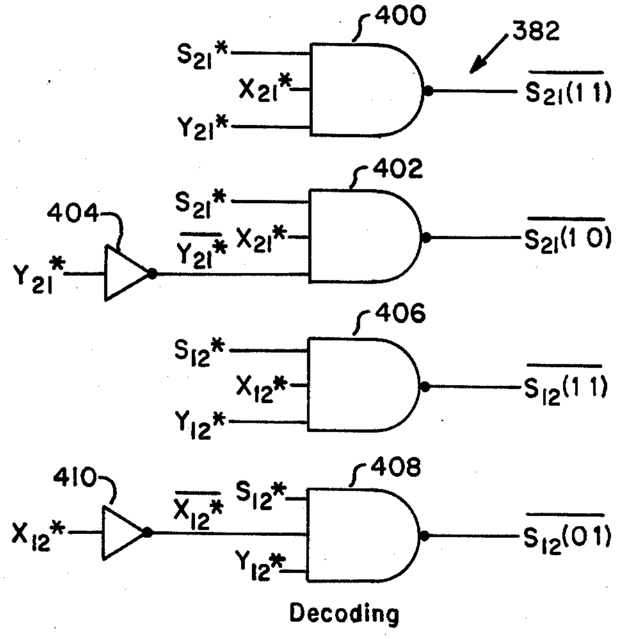

Refer now to FIG. 11 which shows logic units 380 and 382 for providing decoding to generate terms for display elements in the $S_{11}^{*}$, $S_{12}^{*}$, $S_{21}^{*}$ and $S_{22}$ memory cell positions having intensity values of 1, 2 and 3. The logic units 380 and 382 may be made from LSI chips 54S139 or may be derived from conventional logic gates as shown in FIGS. 12 and 13. The following expressions are design equations to further illustrate the simplified requirements of the decoder 200 to develop intensity values for 9 terms corresponding to the 9 display elements of the code as shown in FIG. 3.

$$1=S_{22}(OO)=S_{11}(11)+S_{12}(11)+S_{21}(11)+S_{22}(11)+S_{12}\cdot S_{22}(01)+S_{21}\cdot S_{22}(10)+S_{22}(00) \quad (1)$$

$$2=S_{22}(00)=S_{22}(00)+S_{22}(01)+S_{22}(10)+S_{12}(01)+S_{21}(10)+S_{11}\,S_{22}+S_{12}\,S_{21} \quad (2)$$

INVERT X,$S_{11}\rightarrow S_{13}$ $$1=S_{22}(10)=S_{13}(01)+S_{12}(01)+S_{23}(01)+S_{22}(01)+S_{12}\cdot S_{22}(11)+S_{23}\cdot S_{22}(00)+S_{22}(10)$$

$$2=S_{22}(10)=S_{22}(00)+S_{22}(01)+S_{22}(10)+S_{12}(11)+S_{23}(00)+S_{13}\,S_{22}+S_{12}\,S_{23}$$

INVERT Y,$S_{11}\rightarrow S_{31}$ $$1=S_{22}(01)=S_{31}(10)+S_{32}(10)+S_{21}(11)+S_{22}(10)+S_{32}\cdot S_{22}(00)+S_{21}\cdot S_{22}(11)+S_{22}(O1)$$

$$2=S_{22}(01)=S_{22}(00)+S_{22}(01)+S_{22}(10)+S_{13}(00)+S_{21}(10)+S_{31}\cdot S_{22}+S_{21}\cdot S_{32}$$

INVERT X,Y $S_{13}\rightarrow S_{33}$ $$1=S_{22}(11)=S_{33}(00)+S_{32}(00)+S_{23}(00)+S_{22}(00)+S_{32}\cdot S_{22}(10)+S_{23}\cdot S_{22}(01)+S_{22}(11)$$

$$2=S_{22}(11)=S_{22}(00)+S_{22}(01)+S_{22}(10)+S_{32}(10)+S_{23}(01)+S_{33}\cdot S_{22}+S_{23}\cdot S_{32}.$$

It is to be noted that in order to utilize a minimum of logic decoding structure $S_{22}(10)$ and $S_{22}(10)$ for a 1 and a 2 are formed from the first equation by inverting X in the code in cell $S_{11}$ for forming both a 1 and a 2. The terms $S_{22}(01)$ for forming a 1 and 2 are generated by inverting the value of Y in the code in cell $S_{11}$ and utilizing equations 1 and 2. The terms $S_{22}(11)$ for the intensities 1 and 2 are formed by inverting both X and Y in the codes in cells $S_{13}$ and utilizing the coding of equation 1 and 2. By utilizing the SXY* values which as previously explained are a function of the element E or line L, the proper values are applied to the logic units 380 and 312 and simplified decoding structure may be utilized.

Referring also to FIGS. 12 and 13, the term $\overline{S_{22}(11)}$ is derived from a NAND gate 390 responding to the terms $S_{22}$, $X_{22}^{*}$ and $Y_{22}^{*}$ with the output from the gate 390 indicating a 1 intensity. A NAND gate 392 forms the term $\overline{S_{22}(10)}$ representing a 2 intensity from the input terms $S_{22}$, $\overline{X_{22}^{*}}$ and $\overline{Y_{22}^{*}}$. A NAND gate 394 generates a signal $\overline{S_{22}(01)}$ representative of a 2 intensity in response to the terms $\overline{S_{22}}$, $\overline{X_{22}}$, $Y_{22}$, an AND gate 396 generates a signal $\overline{S_{22}(00)}$ representative of a 3 intensity in response to signals $S_{22}$, $\overline{X_{22}}$, $\overline{Y_{22}}$, and an AND gate 398 generates the signals $\overline{S_{11}(11)}$ representative of a 1 intensity in response to the signals $S_{11}^{*}$, $X_{11}^{*}$ and $Y_{11}^{*}$. Relative to the decoding unit 382, an AND gate 400 generates a signal $\overline{S_{21}(11)}$ representative of a 1 intensity in response to signals $S_{21}^{*}$, $X_{21}^{*}$ and $Y_{21}^{*}$, and an AND gate 402 generates the signal $\overline{S_{21}(10)}$ representative of a 2 intensity in response to the signals $S_{21}^{*}$, $X_{21}^{*}$ and $\overline{Y_{21}^{*}}$ provided by an inverter 404, an AND gate 406 generates the term $\overline{S_{12}(11)}$ representative of a 1 intensity in response to the signals $S_{12}^{*}$, $X_{12}^{*}$ and an AND gate 408 generates a signal $\overline{S_{12}(01)}$ representative of a 2 intensity in response to the signals $S_{12}^{*}$ $\overline{X_{12}^{*}}$ provided by an inverter 410 and the signal $Y_{12}^{*}$. A signal on any of the output leads of the units 380 and 382 is utilized or combined to provide the intensity of writing in the memory element that is being decoded.

Figure 5B:
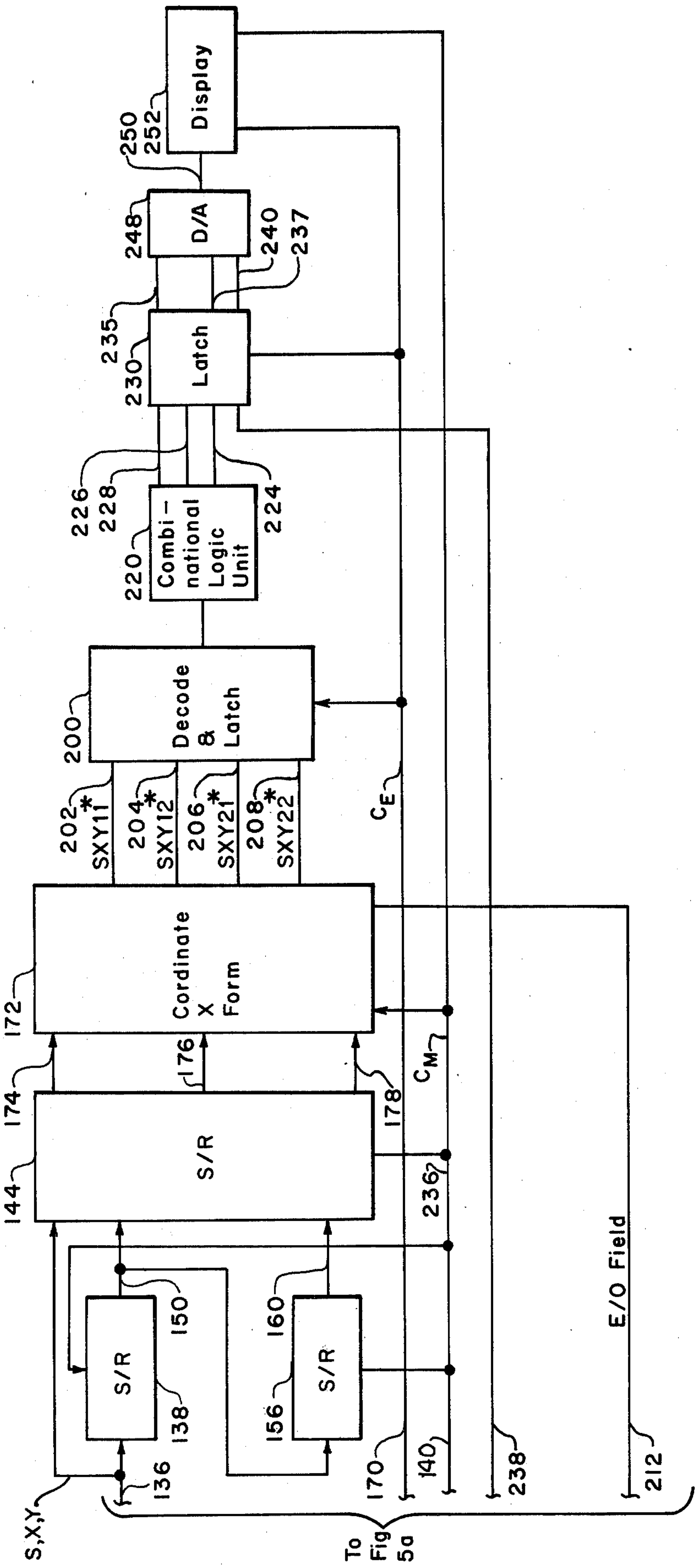

In order to generate the intensity values, the logic unit 220 of FIG. 5*b* develops pulses representative of 1, 2 and 3 intensity values in accordance with the following expressions:

$$1=S_{11}(11)\cdot\overline{S_{12}(X1)}\cdot\overline{S_{21}(1X)}\cdot\overline{S_{22}(00)}\cdot\overline{S_{12}\cdot S_{21}}+S_{12}(11)\cdot\overline{S_{11}(11)}\cdot\overline{S_{21}(1X)}\cdot\overline{S_{22}(00)}\cdot\overline{S_{12}\cdot S_{21}}+S_{21}(11)\cdot\overline{S_{11}(11)}\cdot\overline{S_{12}(X1)}\cdot\overline{S_{22}(00)}\cdot\overline{S_{12}\cdot S_{21}}+S_{22}(11)\cdot\overline{S_{12}(X1)}\cdot\overline{S_{21}(1X)}\cdot\overline{S_{12}\cdot S_{21}}\cdot\overline{S_{11}(11)}$$

$$2=S_{12}(01)\cdot\overline{S_{21}(1X)}\cdot\overline{S_{22}(00)}\cdot\overline{S_{11}(11)}\cdot\overline{S_{12}\cdot S_{21}}+S_{21}(10)\cdot\overline{S_{12}(X'1)}\cdot\overline{S_{22}(00)}\cdot\overline{S_{11}(11)}\cdot\overline{S_{12}\cdot S_{21}}+S_{22}(01)\cdot\overline{S_{12}(X1)}\cdot\overline{S_{21}(1X)}\cdot\overline{S_{11}(11)}\cdot S_{12}\cdot S_{21}+S_{22}(01)\cdot\overline{S_{12}}\cdot\overline{S_{21}(1X)}\cdot\overline{S_{11}}\cdot\overline{S_{12}\cdot S_{21}}+S_{22}(10)\cdot\overline{S_{12}(X1)}\cdot\overline{S_{2}}\text{-}$$

$$\overline{1}\cdot\overline{S_{11}}\cdot\overline{S_{12}\cdot S_{21}}+\overline{S_{12}\cdot S_{21}}\cdot S_{22}(11)\cdot S_{12}(11)\cdot\overline{S_{21}(1X)}\cdot\overline{S_{11}}+S_{22}(11)\cdot\overline{S_{12}(X1)}\cdot S_{21}(11)\cdot\overline{S_{11}}\cdot\overline{S_{12}\cdot S_{21}}+S_{11}(11)\cdot S_{12}(11)\cdot\overline{S_{22}(00)}\cdot\overline{S_{21}(1X)}\cdot\overline{S_{12}\cdot S_{21}}+S_{11}(11)\cdot S_{21}(11)\cdot\overline{S_{22}(00)}\cdot\overline{S_{12}(X1)}\cdot\overline{S_{12}\cdot S_{21}}$$

$$3=S_{22}(00)+T+\overline{S_{22}(10)}\cdot S_{12}(X1)+S_{11}\cdot\overline{S_{22}(00)}+S_{22}(01)\cdot S_{21}(1X)+S_{12}\cdot S_{21}(1X)+S_{22}(11)\cdot S_{12}\cdot S_{21}+S_{22}(01)\cdot S_{12}\cdot S_{21}+S_{22}(10)\cdot S_{12}\cdot S_{21}+S_{22}(01)\cdot S_{12}+S_{22}(10)\cdot S_{21}+S_{22}(11)\cdot S_{12}(01)+S_{22}(11)\cdot S_{21}(10)+S_{21}(10)\cdot S_{11}(11)+S_{12}(X1)\cdot S_{21}+S_{11}(11)\cdot S_{12}(01)$$

In these equations an X in the code indicates that the indicated X or Y value can be either a 0 or a 1.

The majority of the expressions in these equations are for program A. For program B which generates a 1 intensity, the following expressions are utilized:

$$S_{21}(X,X)\ S_{22}(10)\cdot\overline{S_{21}(1,X)}\cdot S_{12}\overline{(X,1)}\cdot\overline{S_{12}\cdot S_{21}}$$

and $$S_{12}\cdot S_{22}(01)\cdot\overline{S_{11}(11)}\cdot\overline{S_{12}(X1)}\cdot\overline{S_{21}(1X)}.$$

For program D which generates a 2 intensity, the expression $S_{12}\cdot S_{21}\cdot\overline{S_{22}(00)}\cdot\overline{S_{12}(X1)}\cdot\overline{S_{21}(1X)}$ is utilized. For program C which generates a 3 intensity the term $S_{11}\cdot S_{22}$ is utilized. Thus in the illustrated system, the B, C and D programs as well as the A program control the intensity provided by the combinational logic unit 220.

Figure 15:
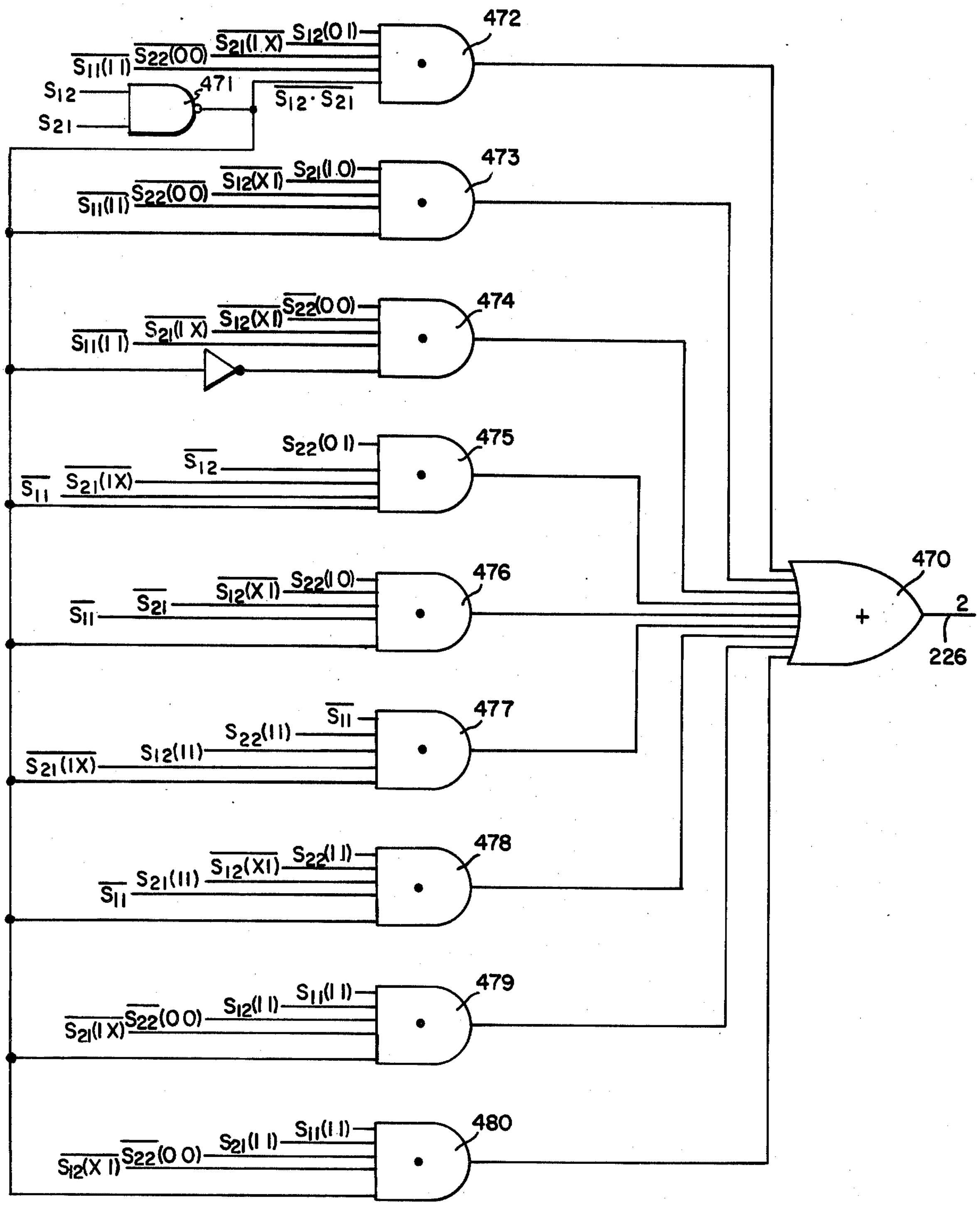
Figure 16:
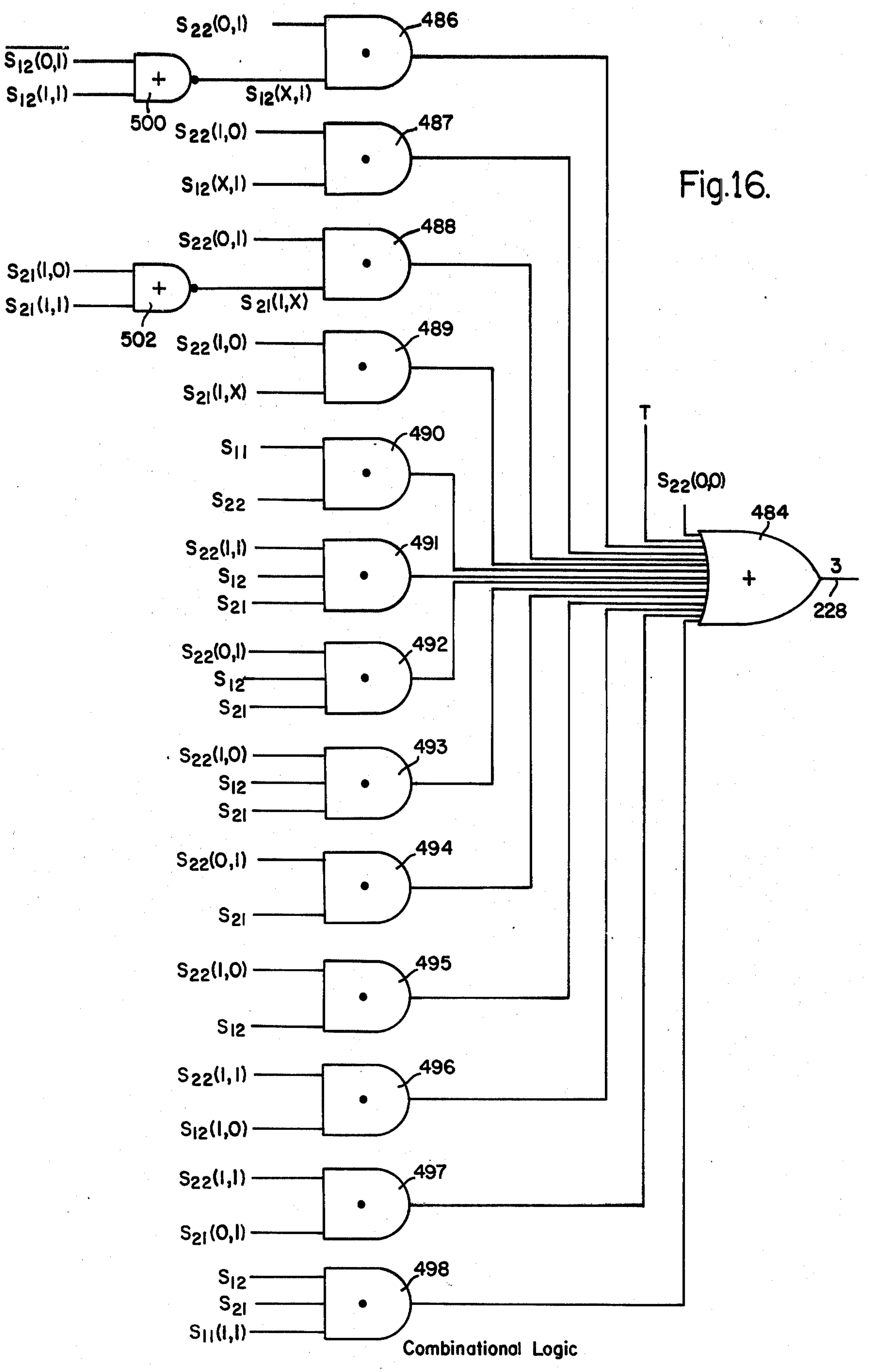

Referring now to FIGS. 14, 15 and 16 the logic unit 220 of FIG. 5*b* includes an OR gate 450 coupled to receive signals from AND gate 452, 454, 456, and 460 all deriving terms from the 1 element delay circuits 440, 442 and 444. The AND gate 452 receives the terms $S_{11}(11)$, $\overline{S_{12}(X1)}$, $\overline{S_{21}(1X)}$, $\overline{S_{22}(00)}$ and $\overline{S_{12}\cdot S_{21}}$, the AND gate 454 receives the terms $S_{12}(11)$, $\overline{S_{11}(11)}$, $\overline{S_{21}(1X)}$ and $\overline{S_{12}\cdot S_{21}}$, $\overline{S_{22}(00)}$, the AND gate 456 receives the terms $S_{21}(11)$, $\overline{S_{11}(11)}$, $\overline{S_{12}(X1)}$ and $\overline{S_{22}(00)}$ and $\overline{S_{12}\cdot S_{21}}$ and the AND gate 460 receives the terms $S_{22}(11)\cdot\overline{S_{12}(X1)}$, $\overline{S_{21}(1X)}$, $\overline{S_{11}(11)}$ and $\overline{S_{12}\cdot S_{21}}$. *The term* $S_{12}\cdot S_{21}$ is generated by an AND gate 464 responding to the terms $S_{12}$ and $S_{21}$.

In order to generate the signal representative of a 2 intensity an OR gate 470 as shown in FIG. 15 responds to AND gates 472 to 480 each receiving terms from the delay elements 440, 442 and 444. The term $\overline{S_{12}\cdot S_{21}}$ is generated by an AND gate 471 responding to the terms $S_{12}$ and $S_{21}$. The AND gate 472 responds to the terms $S_{12}(01)$, $\overline{S_{21}(1X)}$, $\overline{S_{22}(00)}$, $\overline{S_{11}(11)}$, $\overline{S_{12}\cdot S_{21}}$, the AND gate 473 responds to the terms $S_{21}(10)$, $\overline{S_{12}(X1)}$ $\overline{S_{22}(00)}$, $\overline{S_{11}(11)}$, $\overline{S_{12}\cdot S_{21}}$, the AND gate 474 responds to the terms $\overline{S_{22}(00)}$, $\overline{S_{12}(X1)}$, $\overline{S_{21}(1X)}$, $\overline{S_{11}(11)}$, $\overline{S_{12}\cdot S_{21}}$ and the AND gate 475 responds to the terms $S_{22}(01)$, $\overline{S_{12}(X1)}$, $\overline{S_{11}(11)}$, $\overline{S_{12}\cdot S_{21}}$, and $\overline{S_{12}}$, and the AND gate 476 responds to the terms $S_{22}(10)$, $\overline{S_{12}(X1)}$, $\overline{S_{21}}$, $\overline{S_{11}}$, $\overline{S_{12}\cdot S_{21}}$. The AND gate 477 responds to the terms $S_{12}\cdot S_{21}$, $S_{22}(11)$, $\overline{S_{11}}$, $S_{12}(11)$ and $\overline{S_{21}(1X)}$, the AND gate 478 responds to the terms $S_{22}(11)$, $S_{12}(11)$, $\overline{S_{21}(1X)}$, $\overline{S_{11}}$, $\overline{S_{12}\cdot S_{21}}$, the AND gate 479 responds to the terms $S_{11}(11)$, $S_{12}(11)$, $\overline{S_{22}(00)}$, $\overline{S_{21}(1X)}$, $\overline{S_{12}\cdot S_{21}}$ and the gate 480 responds to $S_{11}(11)$, $S_{21}(11)$, $\overline{S_{22}(00)}$, $\overline{S_{12}(X1)}$, $\overline{S_{12}\cdot S_{21}}$.

Referring principally to FIGS. 16 the 3 intensity value is provided on the lead 228 from an OR gate 484 responding to AND gates 486 to 499. The AND gate 486 receives the terms $S_{22}(10)$, $S_{12}(X1)$, the AND gate 487 receives the terms $S_{22}(00)$ and $S_{11}$, the AND gate 488 receives the terms $S_{22}(01)$ and $S_{21}(1X)$, the AND gate 489 receives the terms $S_{12}$ and $S_{21}(1X)$, the AND gate 490 receives the terms $S_{12}(X1)$ and $S_{21}$, the AND gate 491 receives the terms $S_{22}(11)$, $S_{12}$ and $S_{21}$ and the AND gate 492 receives the terms $S_{22}(01)$, $S_{12}$ and $S_{21}$. The AND gate 493 receives the terms $S_{22}(10)$, $S_{12}$ and $S_{21}$, the AND gate 494 receives the terms $S_{22}(01)$ and $S_{12}$, the AND gate 495 receives the terms $S_{22}(10)$ and $S_{21}$, the AND gate 496 receives the terms $S_{22}(11)$ and $S_{12}(01)$, the AND gate 497 receives the terms $S_{22}(11)$ and $S_{21}(10)$ and the AND gate 498 receives the terms $S_{12}(10)$ and $S_{11}(11)$. The AND gate 499 receives the terms $S_{12}(X1)$ and $S_{21}$, and the AND gate 501 receives the terms $S_{21}(1X)$ and $S_{12}$. The terms $S_{12}$ (X1) is provided by an OR gate 500 responding to $\overline{S_{12}(01)}$ and $S_{12}(11)$ and the term $S_{21}(1X)$ is provided by OR gate 502 responding to the terms $S_{21}(10)$ and $S_{21}(11)$. The signals on the lead 224, 226 and 228 are then delayed 1 element clock period in the latch unit 230 and applied to the digital-to-analog converter 248.

The digital-to-analog converter as shown in FIG. 17 receives the blanking and synchronizing terms on the lead 238 and receives the 1, 2 and 3 intensity terms on respective leads 236 and 238 and 240. Each of the inputs includes a diode 510 coupled between the lead 258 and the lead 511 which is in turn coupled through a resistor 512 to a positive terminal. Diodes 514, 516 have their anode to cathode path coupled through a resistor 520 to ground as well as to the output lead 250. The value of the resistor such as 512 varies for each input to provide the proper output combined signal for separation in the display unit 250. Separation of the blanking, synchronizing and intensity grid signals is well known in the art and will not be explained in further detail. The intensity signal derived from the signal on the lead 250 is applied to the intensity grid of the cathode ray tube in the display 252.

Referring now to FIG. 18 the smooth programs B, C and D will be explained, which programs may be utilized to improve the smooth effect of the program A. Programs B, C and D equations are as follows and the decoding structure is enclosed in FIGS. 14, 15 and 16:

Program B $$1=S_{22}(00)=S_{21}(XX)\cdot S_{22}(10)+S_{12}(XX)\ S_{22}(01)$$

$$1=S_{22}(01)=S_{21}(XX)\cdot S_{22}(11)+S_{32}(XX)\cdot S_{22}(00)$$

$$1=S_{22}(10)=S_{12}(XX)\cdot S_{22}(11)+S_{23}(XX)\ S_{22}(00)$$

$$1=S_{22}(11)=S_{32}(XX)\cdot S_{22}(10)+S_{23}(XX)\ S_{22}(01)$$

Program C $$2=S(00)=S_{11}(XX)\ S_{22}(XX)$$

$$2=S(01)=S_{31}(XX)\ S_{22}(XX)$$

$$2=S(10)=S_{13}(XX)\ S_{22}(XX)$$

$$2=S(11)=S_{33}(XX)\ S_{22}(XX)$$

Program D $$2=S(00)=S_{21}(XX)\cdot S_{12}(XX)$$

$$2=S(01)=S_{21}(XX)\cdot S_{32}(XX)$$

$$2=S(10)=S_{12}(XX)\cdot S_{23}(XX)$$

$$2=S(11)=S_{23}(XX)\cdot S_{32}(XX)$$

The program B comprises the smoothing for straight lines. For field 1, and writing a one into display element location 00 of box 540 (indicated by the 9), an 01 code in box 540 and any code in box $S_{12}$ or 10 code in box 542 and any code in box $S_{21}$ is required. A one is written into display element position 01 when a 11 code is in box 544 and any code is in box $S_{21}$ or an 00 code is in box 546 and any code is in box $S_{32}$. A one is generated for display element position 10 when a 11 code is in box 548 and 00 code is in cell $S_{12}$ or when a 00 code is in box 550 and any code is in cell $S_{23}$. A one is generated in instantaneous position 11 when a 10 code is in box 552 and any code is in box $S_{32}$ or when an 01 is in box 554 and any code is in cell $S_{23}$.

It is to be noted that boxes 542 and 544 are restricted to memory line L and memory element E-1, boxes 540 and 548 to memory line L-1 and memory element E, boxes 550 and 554 to memory line L and memory element E+1 and boxes 546 and 552 to memory line L+1 and memory element E, all when the cell at which code A is developing signals, is memory line L and memory element E.

For smoothing program C which improves the smoothing for 45 degree lines, a 2 intensity is written into position 00 in box 560 when any code is in cell $S_{11}$ and cell $S_{22}$, is written into position 01 of box 561 when any code is in boxes $S_{31}$ and $S_{22}$, is written into box 562 when any code is in boxes $S_{13}$ and $S_{22}$ and is written into position 11 of box 564 when any code is in cells $S_{33}$ and $S_{22}$. Boxes 560, 562, 564 and 561 when the memory line and elements having code A therein are respectively L−1 and E−1, L−1 and E+1, L+1 and E+1, and L+1, E−1. It is to be noted that since program C always results in a 3 intensity, the decoding is included in the 3 logic structure of FIG. 16.

Smoothing program D which improves 45 degree lines writes a 2 intensity into position 00 of $S_{22}$ when any codes are in $S_{21}$ and $S_{12}$, into position 01 when any codes are in $S_{21}$ and $S_{32}$, into position 10 when any codes are in $S_{12}$ and $S_{23}$, and into position 11 when any codes are in $S_{23}$ and $S_{32}$.

The conditions under which the 2 intensity is generated for $S_{22}$ positions of 00, 10, 11 and 01 are respectively memory lines and elements L and E−1 as well as L−1 and E, L−1 and E as well as L and E+1, L+1 and E as well as L and E−1, and L and E−1 as well as L+1 and E.

Referring now to FIG. 19 the non-smooth video program when S equals 0 will be further explained. The non-smooth program when S equals 0 provides maximum intensity of 3 to provide a normal solid line.

For a 10 code in box 570 3 intensities are developed for all 4 display element positions. For a 11 code in box 572 a 3 intensity is developed in position 01 and for writing 3 intensity into positions 00 and 10 in a box 574 a 11 code is required in cell $S_{32}$.

Figure 20:
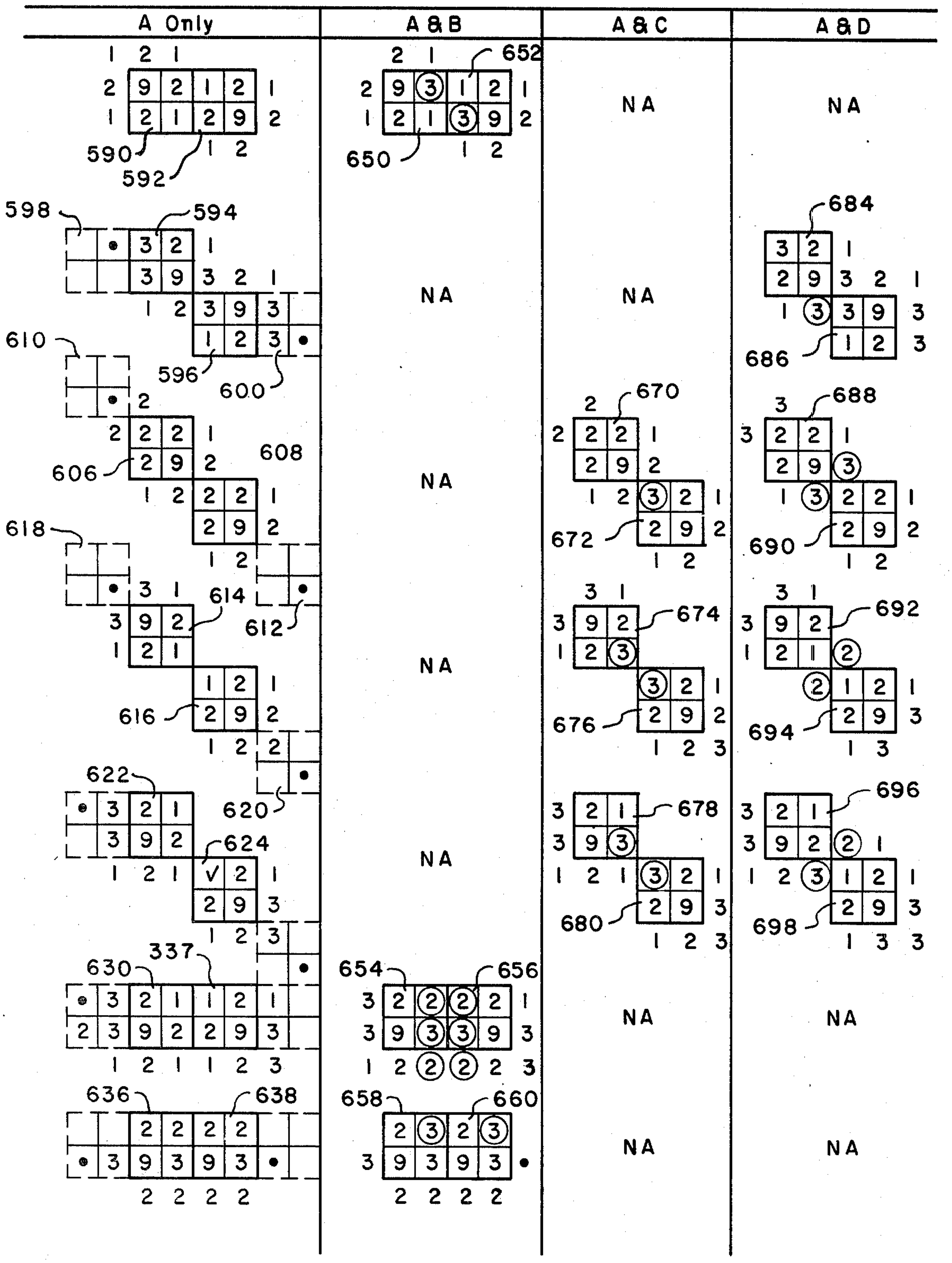
FIG. 20 is a schematic diagram of memory cells and display elements for explaining the effect of combining the different programs and codes.

Referring now to FIG. 20 the program A which provides intensity summing in certain display element positions when forming lines will be explained. Memory cell boxes 590 and 592 which are respectively an 00 and a 11 code when provided by the symbol generator do not sum any values as can be compared with the intensity values of the codes in isolated positions of FIG. 3. When boxes 594 and 596 of respective codes 11 and 10 are generated, with the codes 10 and 11 in adjacent boxes 598 and 600, the positions 00 and 01 are increased to an intensity of 3 of box 594, the intensity at display element position 602 is increased from 1 to 3, the intensity in box 596 at position 00 is increased from 2 to 3 and the intensity at positions 00 and 01 of box 600 which were a 2 and a 1 for $S_{10}$ are increased to an intensity of 3.

It can be seen that the staircase effect is relatively small along boxes 594 and 596 as a result of the intensity distribution.

For boxes 606 and 608 11 codes with adjacent boxes 610 and 612 of 11 codes the 00 position of boxes 606 and 608 is increased from 1 to 2. For boxes 614 and 616 of respective codes 00 and 11 when forming a line through boxes 618 and 620 of respective 11 codes, the display element position to the left and above the 00 position of box 614 is increased to an intensity of 3 and the 00 position of box 620 is increased to 2. Boxes 622 and 624, 630 and 632 and 636 and 638 show other conditions in which program A provides improvements when forming straight lines.

Looking now at a combined program A and B, boxes 650 and 652 for the same line as boxes 590 and 592 changes the intensity at position 10 of box 650 to 3 and the intensity of position 01 of box 652 to 3. For the positions labeled NA the additional program in FIG. 20 either does not change the program A or does not logically respond to the conditions shown. Boxes 654 and 656 and boxes 658 and 660 provides increases of intensity as may be seen by comparison with the boxes for only program A.

For programs A and C, boxes 670 and 672 show a 2 intensity increased to 3 as circled, boxes 674 and 676 show two 1 intensities increased to 3, and boxes 678 and 680 show a 2 and a 1 intensity increased to 3 intensity.

For programs A and D, boxes 684 and 686 show a 2 intensity increased to a 3 intensity, boxes 688 and 690 shows 2 intensity display elements increased to 3 intensity display elements, boxes 692 and 694 show 2 intensity values added to two display positions, and boxes 696 and 698 show a 3 and a 2 intensity provided in two display positions one of these by increasing a 1 intensity.

FIGS. 21 to 25 show the combinational effect of lines at respective angles relative to the horizontal of 0°, 10°, 20°, 40° and 31° lines.

Figure 21:
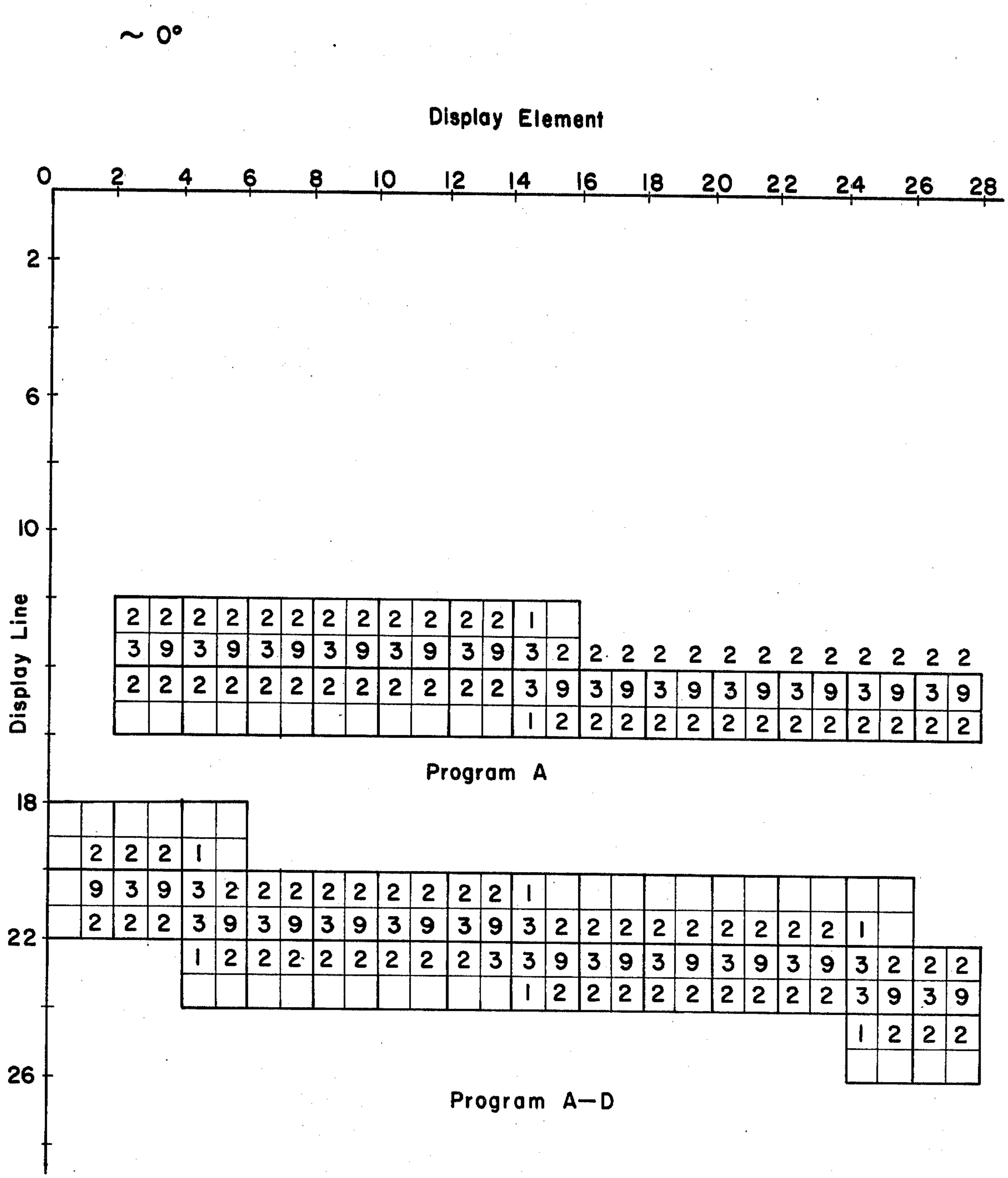
FIG. 21 is a schematic block diagram showing the resulting effect of the smoothing on a zero degree slope of line.
Figure 22:
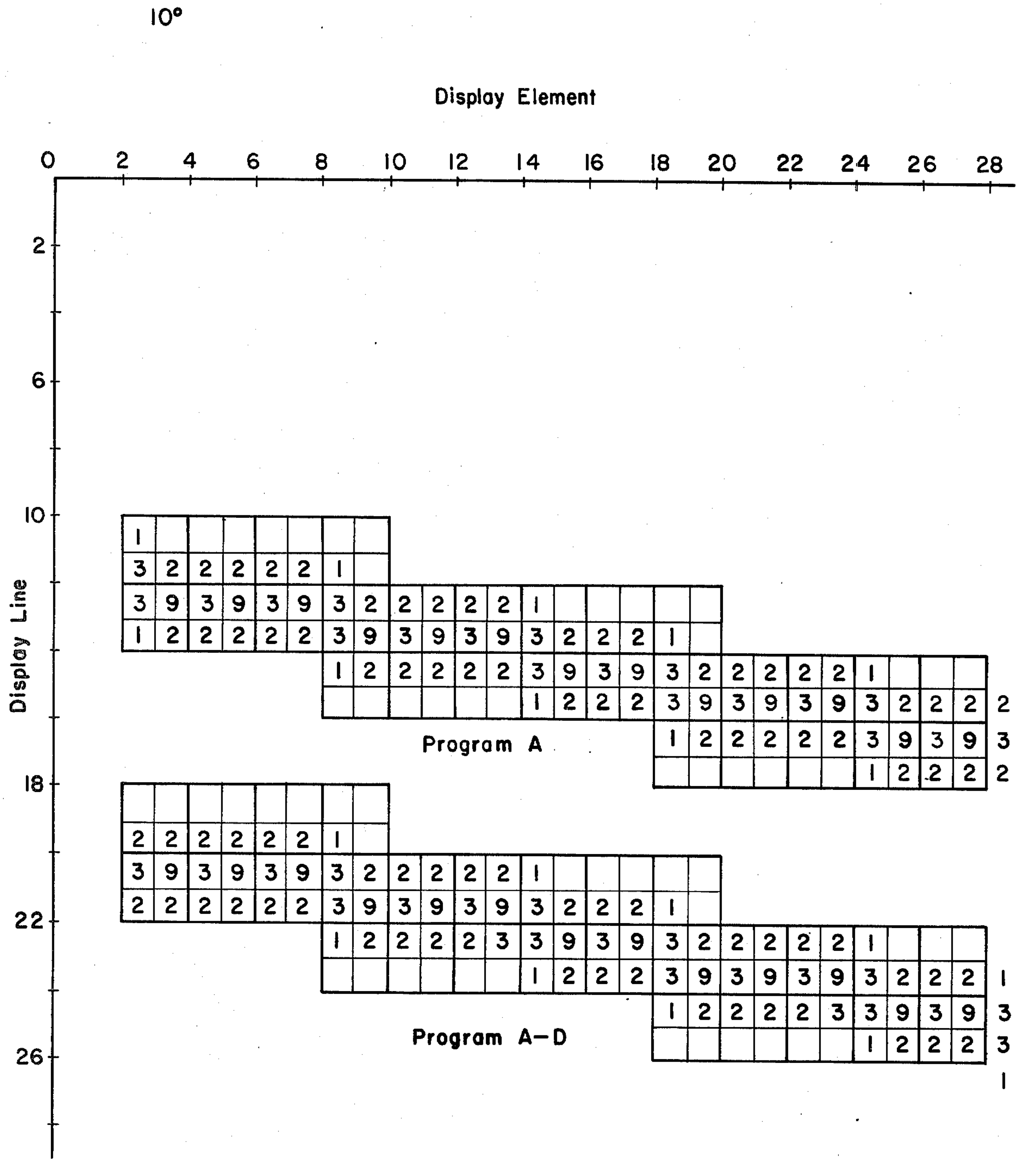
FIG. 22 is a schematic block diagram showing the resulting effect of the smoothing on a ten degree line.
Figure 23:
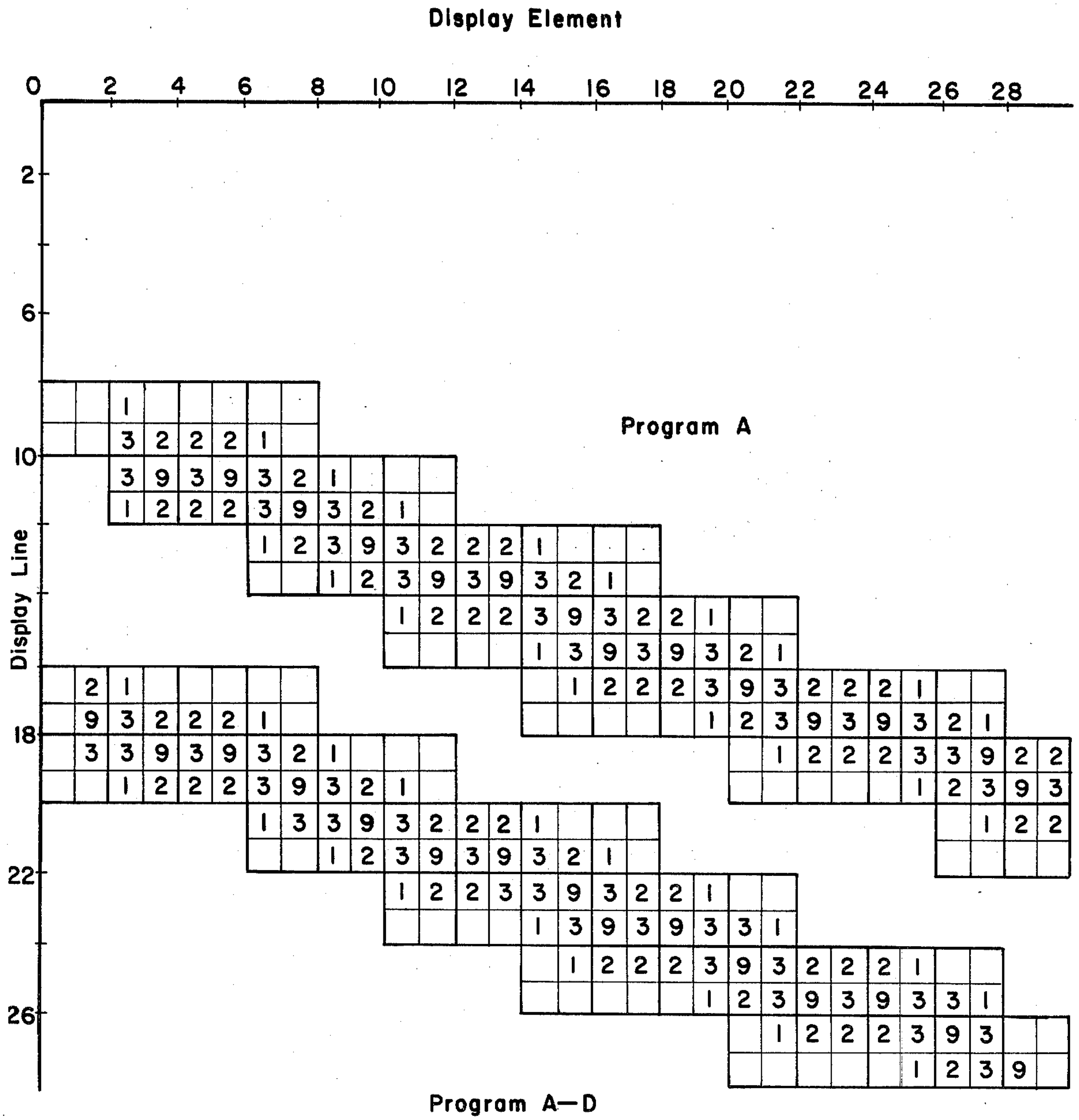
FIG. 23 is a schematic block diagram showing the resulting effect of the smoothing in accordance with the invention on a twenty degree slope line.
Figure 24:
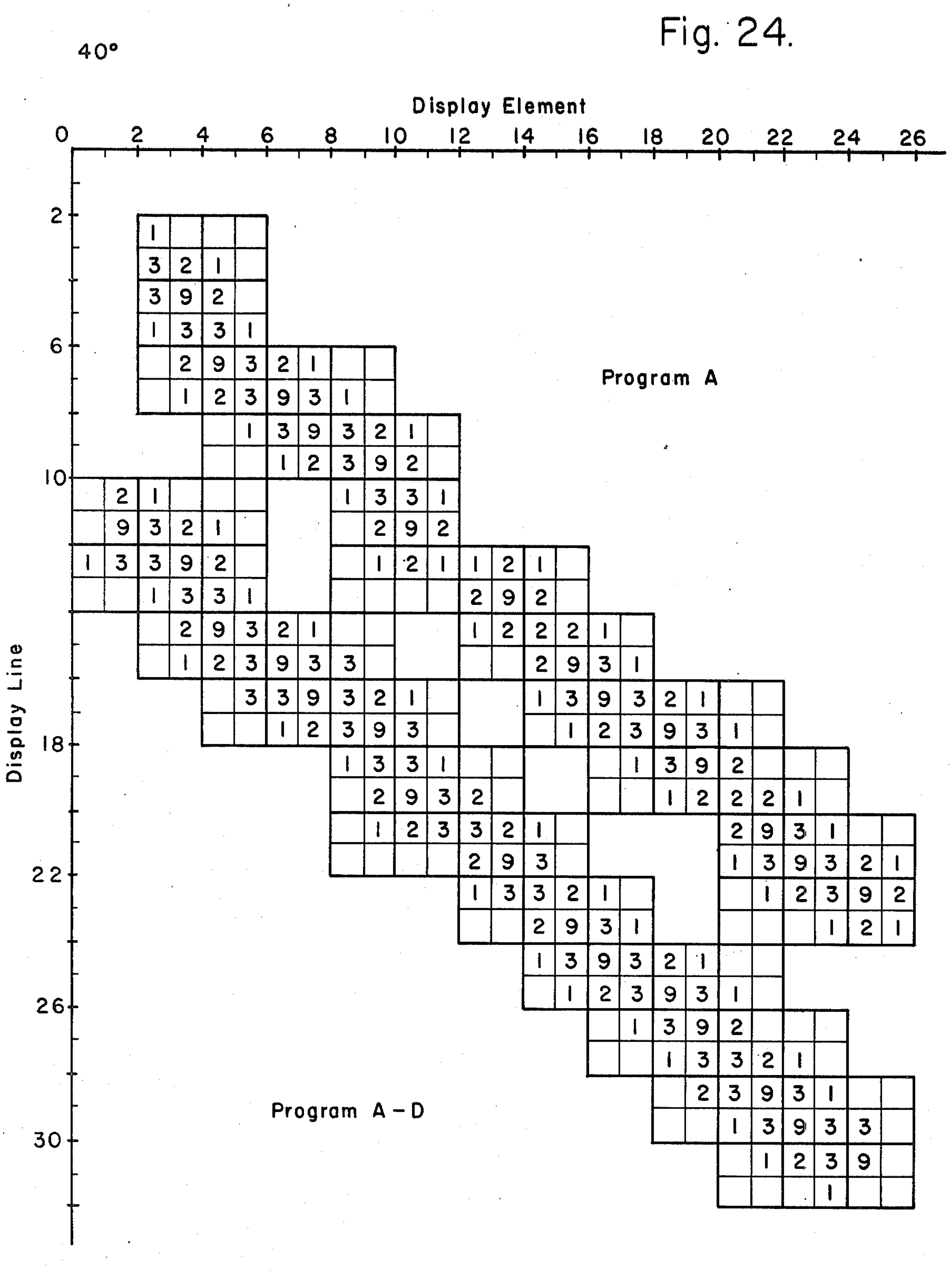
FIG. 24 is a schematic block diagram of the code and the display elements showing the resulting effects of the smoothing on a forty degree slope line.
Figure 25:
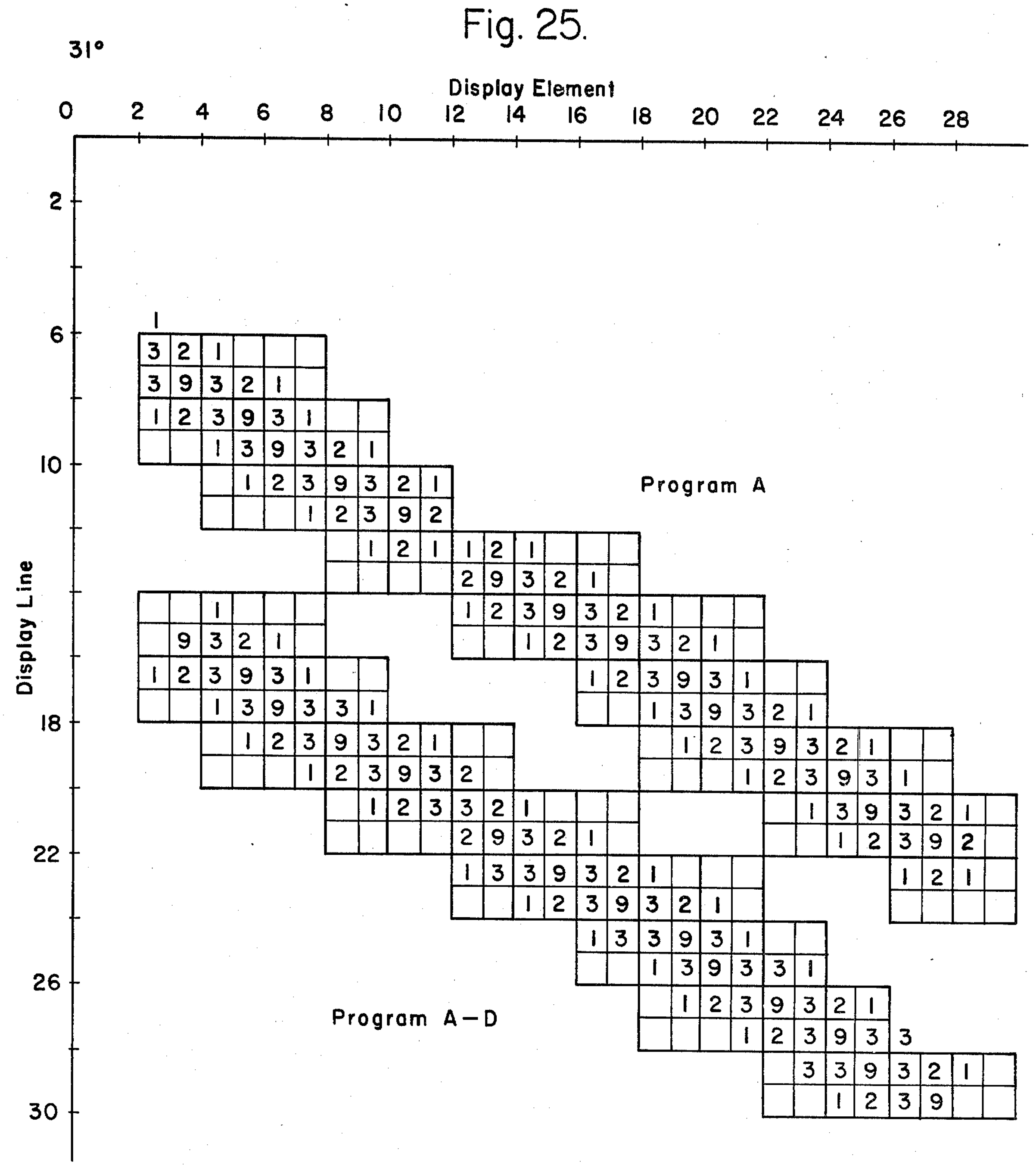
FIG. 25 is a schematic block diagram showing the code and the display elements for explaining the resulting effect of the smoothing on a one hundred and thirty degree slope line.

FIGS. 21 and 22 show the lines for program A and program A through D and FIGS. 23 to 25 show the lines found on the display for program A and programs A through D. From FIGS. 2, 8 and 18 the resultant intensity values in the display cell or points show how the resulting lines are provided partly by combining intensity values.

Figure 26:
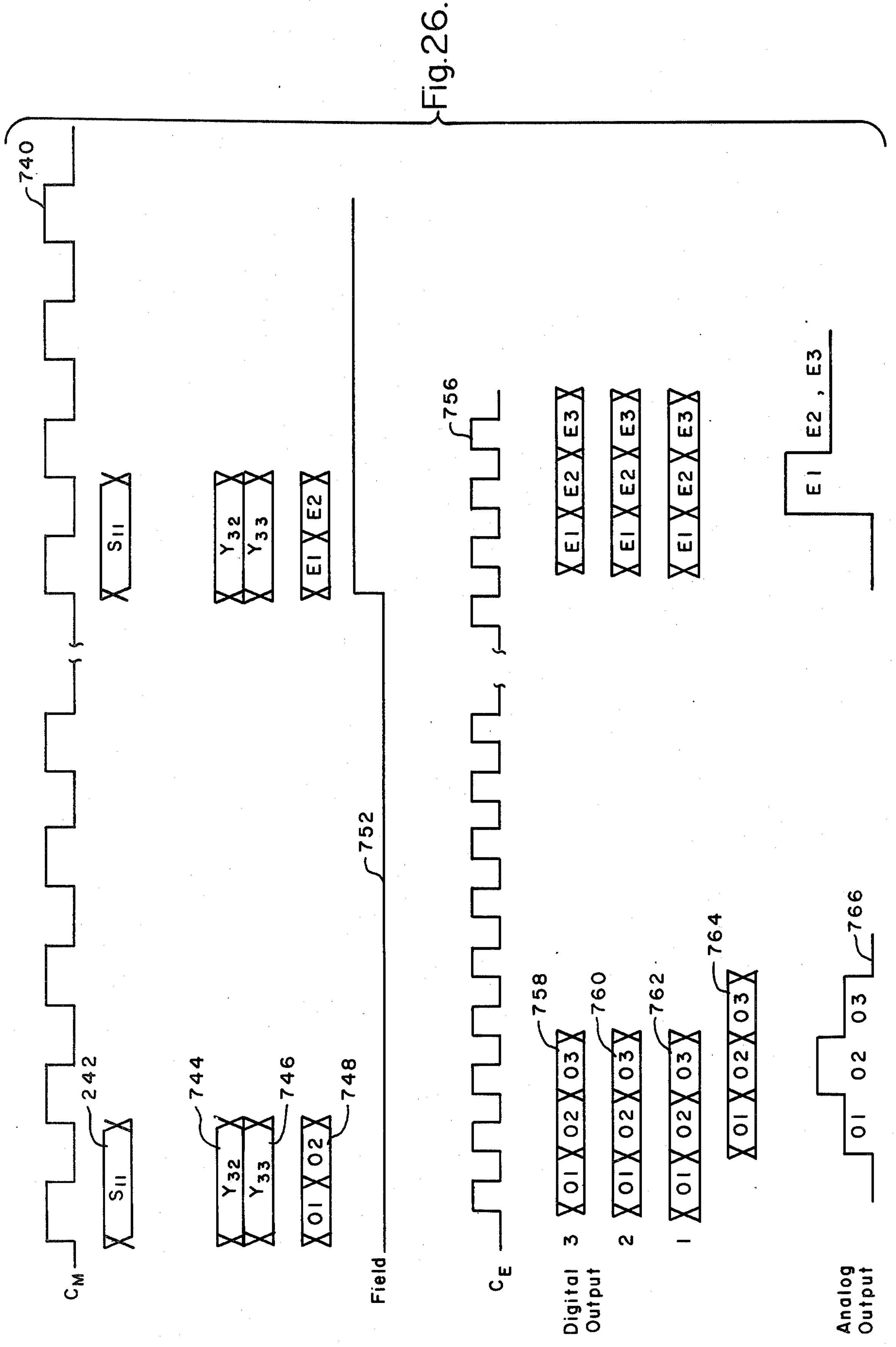
FIG. 26 is a schematic block diagram of waveforms of voltage as a function of time for further explaining the operation of the system in accordance with the invention.
Figure 27:
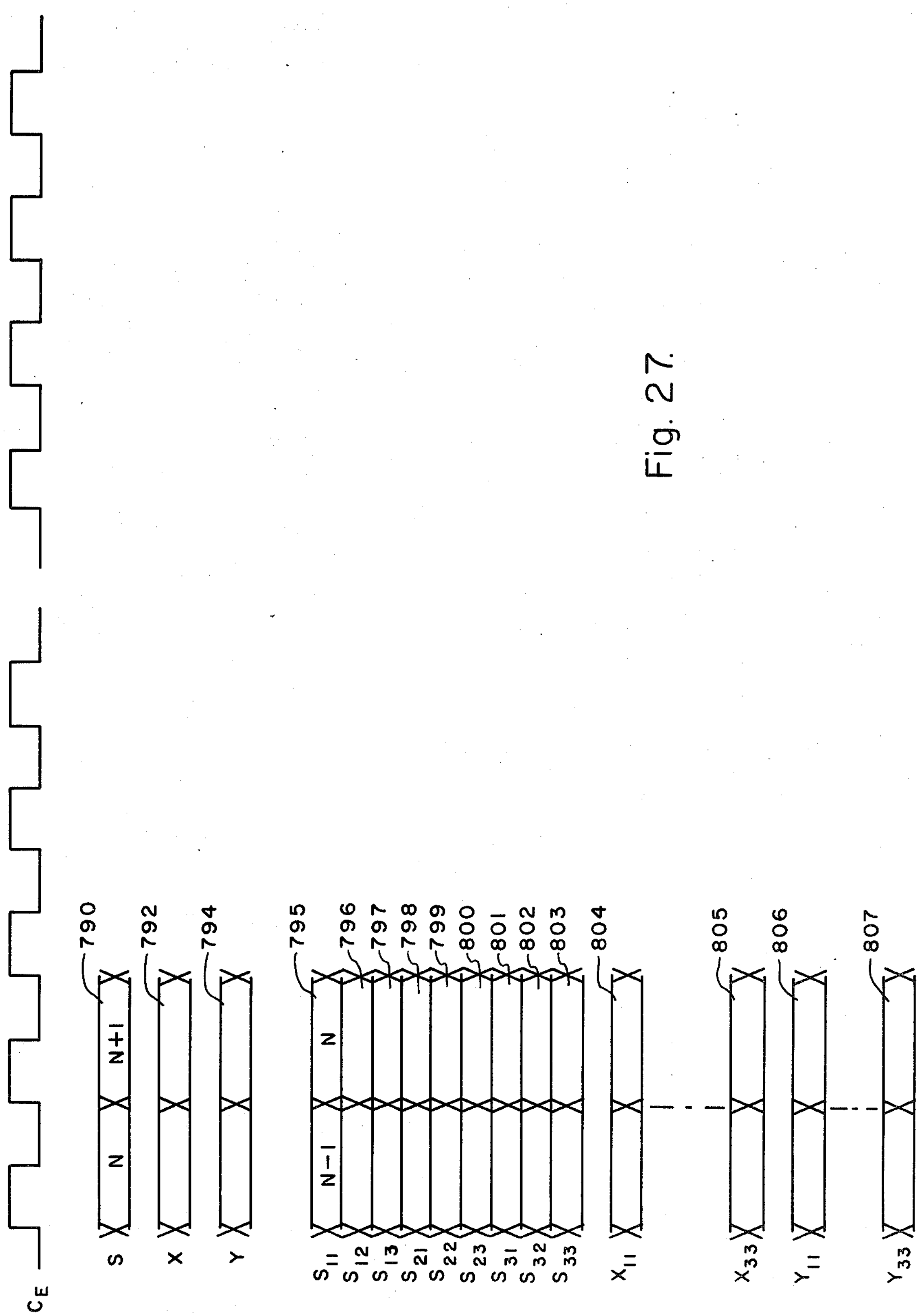
FIG. 27 is a schematic block diagram of waveforms of voltage as a function of time for further explaining the operation of the system of the invention.

Referring now to FIGS. 26 and 27, as well as to FIGS. 9–11 a waveform shows the memory clock $C_M$ and the output of the shift registers for the odd 0 field 144 is shown by waveforms 742, 744 and 746, the shift register 144 providing a one memory clock delay. The input to the D/A converter after two clock delays from the output of the shift register 144 is shown by a waveform 748. The even-odd field signal is shown by a waveform 752 and changes level for each field of a complete display raster. The element clock signal of a waveform 756 is twice the frequency of the memory clock and is utilized in read out from the memory 51 and all subsequent decoding. The signals of waveforms 758, 760 and 762 show the combined logic intensity from latches 220 and the signal of a waveform 764 shows the outputs from the combinational logic unit 221 after a one element clock delay in the latch 220. The output from the combinational logic unit 221 is shown by a waveform 766. Similar signals are shown for forming the even E field of the display.

In FIG. 27 relative to the element clock of the waveform 740, waveforms 790, 792 and 794 show the S, X and Y input signals to the shift registers 144 and the output of shift registers 144 is shown by waveforms 795 to 803 illustrating S, waveforms 804 and 805 illustrating X and waveforms 826 and 807 illustrating Y. There is a one element clock delay through the shift register 144.

Thus there has been described a symbol smoothing system that utilizes codes in memory that not only defines intensity but position of the display elements to allow use of a relatively small refresh memory with a high degree of display resolution. For decoding each display element, three memory lines each of three memory elements may be interrogated and decoded. The decoding not only responds to the code values provided by the bits in a single memory cell but combines the codes in surrounding memory cells (related in time position to the display elements) to provide a smooth line of any desired configuration. Another feature in accordance with the invention is the use of common decoding structure by altering the stored codes to be compatible with that decoding structure with the altered code representing the correct condition to be decoded. The concepts of the invention are not limited to the illustrated arrangement and may operate with any code having a desired intensity distribution, may operate without the smoothing value S in the code when all symbols are smoothed, and may use any window or sample size and shape and is not limited to a 3 by 3 memory sampling but may have other windows such as a 2 by 3 by 5 memory element, or a 1 memory lines by e memory elements sampling window. If a smoothing symbol S is not utilized in the code, then the refresh memory size is decreased by 25 percent. The system as illustrated provides an increase of display element writing efficiency of 300 percent. It is also to be noted that the combinations of the invention are not limited in operation to utilizing a symbol generator, as the desired codes for symbols, lines and curves may be stored in memory and continually accessed and utilized.

What is claimed is:

1. A display system for providing in a time sequence a display of elements along display lines on a display with each displayed element having a controlled intensity, comprising:

a source of binary display codes, each code representing positional information of a predetermined pattern of display elements, and each combination of codes representing a predetermined intensity distribution, said source of binary display codes having a memory cell for each four display elements with each memory cell storing a single display code comprised of three or more binary bits, each single display code contributing to the intensity value of at least four display elements; and decoding means responsive to said source of binary display codes for generating decoded values representing one of three or more intensity values of said pattern of display elements in a time sequence corresponding to the time sequence of said display elements and including means for responding to the codes in a plurality of memory cells, with the codes from a predetermined number of memory cells contributing to the intensity of predetermined display elements.

2. A display system for providing signals to a display means having a display formed of lines of display elements, said elements being displayed with a controlled intensity distribution comprising:

memory means having memory cells each corresponding to four display elements, with predetermined groups of cells representing lines of cells and each line of cells corresponding to a predetermined different plurality of said display lines, said memory cells each being capable of storing a code in a combination of memory elements representative of a positional pattern of greater than two intensity values of at least the four display elements corresponding to one of said memory cells, said code providing four intensity values, means coupled to said memory means for providing the codes from a selected number of memory cells corresponding to a selected number of lines of cells substantially coincident in time, and decoding means coupled between said memory means and said display means and responding to codes in said selected number of cells for generating one of said greater than two intensity values for at least said four display elements corresponding to one of said selected memory cells storing a code and for applying said intensity values to said display means.

3. The combination of claim 2 in which said memory means stores a code in each cell representative of greater than two intensity values of the four display elements corresponding to respective memory cells and a predetermined number of display elements in corresponding adjacent memory cells, and said decoding means includes means for combining said greater than two intensity values for display elements controlled by codes in adjacent memory cells and forming greater than two intensity values of said four display elements and said predetermined number of display elements.

4. The combination of claim 2 in which said selected number of memory cells of the selected number of lines of cells are first, second and third memory cells of first, second and third lines of cells and in which said decoding means includes means for developing greater than two intensity values for the display elements corresponding to one of said memory cells being the second memory cell of the second line of cells and in which said selected memory cell corresponds to first and second display elements of first and second display lines and in which first and second memory cells of said first and second lines of cells control the intensity of the first display element of said first display line corresponding to said selected memory cell, said second and third memory cells of said first and second memory lines of cells control the intensity of the second display element of said first display line corresponding to said selected memory cell, said first and second memory cells of said second and third lines of cells control the intensity of said first display element of said second display line corresponding to said selected memory cell and said second and third memory cells of said second and third lines of cells control the intensity of said second display element of said second display line corresponding to said selected memory cell, and in which said decoding means includes rotating means for changing the code from selected ones of said memory cells except said second memory cell of said second line of cells, as a function of the display element and display line being decoded of said selected memory cell so that the codes to be decoded for each first and second display element of said first and second display lines of said selected memory cell have similar code values for common intensity values, and common decoding means coupled to said rotating means for developing intensity values and applying said intensity values to said display means.

5. A display system for displaying on a display a plurality of display elements along a plurality of display lines comprising:

memory means having a plurality of memory cells, each group of said cells associated with a predetermined two display lines, and each memory cell corresponding to two display elements along two display lines, a source of display codes coupled to said memory means for storing codes in selected memory cells, each code representing positional information of predetermined portions of said display elements, a combination of said codes representing the intensity distribution of the four display elements corresponding to the memory cell and selected display elements corresponding to adjacent memory cells, said code being three or more binary bits, means coupled to said memory means for providing the codes in nine memory cells of first, second and third memory cells for first, second and third memory groups, decoding means coupled to said means coupled to said memory means, for developing greater than two intensity values for at least the display elements corresponding to the said second memory cell of said second memory group by responding to the code in said first, second and third memory cells of said first, second and third groups, said greater than two intensity values providing each of said display elements for at least the display elements corresponding to the second memory element of said second memory line, with a selected display intensity, and means coupling said decoding means to said display means for controlling the intensity of each display element.

6. The combination of claim 5 in which said decoding means includes rotating means for changing the code when deriving the intensity of all but one display element in the second memory cell of said second memory line as a function of the display element and display line of said second memory element of said second memory line to allow decoding for each display element by common decoding means said first and second display elements of said first display line being respectively a function of the code in said first and second memory elements of said first and second memory lines and said second and third memory elements of said first and second memory lines, said first and second display elements of said second display line being respectively a function of the first and second memory elements of the second and third memory lines and of said second and third memory elements of said second and third memory lines, and common decoding means in said decoding means responsive to said codes provided by said rotating means to provide said greater than two intensity values.

7. A decoding system for display means having a display of a plurality of lines of display elements comprising:

a source of stored positional codes, each stored code contributing to three or more display intensity values for nine display elements, said positional codes having three or more binary bits, and decoding means coupled to said source of display codes for responding to a selected number of said codes for providing three or more intensity values of the intensity levels for said nine display elements, said decoding means coupled to said display means for applying said intensity values thereto so that said elements are displayed with three or more selected intensity values.

8. The combination of claim 7 in which said decoding means includes means for combining said intensity values for selected display elements.

9. A system for controlling the intensity of displayed lines of elements of a display means comprising:

means for storing codes in memory elements, each code representing display element positional information, each combination of codes representing a predetermined intensity distribution, each memory element corresponding to a selected number of display elements and representing an intensity distribution for said selected number of display elements in the corresponding memory element and predetermined surrounding display elements, and decoding means coupled between said means for storing and said display means and responding to the code in a selected number of memory elements for developing greater than two intensity values for said selected display elements corresponding to each memory element and said predetermined surrounding display elements.

10. A display system for providing in a time sequence a display of elements along display lines on a display with each displayed element having a controlled intensity, comprising:

a source of binary display codes, each code representing positional information of a predetermined pattern of display elements, and each combination of codes representing a predetermined intensity distribution, said source of binary display codes having a memory cell for each four display elements with each memory cell storing a single display code containing three or more binary bits, each single display code contributing to the intensity value of at least said four display elements; and decoding means responsive to said source of binary display codes for generating decoded values representing three or more intensity values of said pattern of display elements in a time sequence corresponding to the time sequence of said display of elements and including means for responding to the code in a selected memory cell and a predetermined number of additional memory cells for providing three or more intensity values for said display elements.

* * * * *